United States Patent [19]

Berrie et al.

[11] 3,926,944

[45] Dec. 16, 1975

[54] WATER-SOLUBLE CELLULOSE REACTIVE AZO DYESTUFFS CONTAINING 3-AZO-2-HYDROXY-N-SUBSTITUTED PYRID-6-ONE RADICAL

[75] Inventors: Alistair Howard Berrie; Richard Budziarek, both of Manchester, England

[73] Assignee: Imperial Chemical Industries Limited, London, England

[22] Filed: Aug. 10, 1973

[21] Appl. No.: 387,334

Related U.S. Application Data

[63] Continuation of Ser. No. 100,413, Dec. 21, 1970, abandoned, which is a continuation-in-part of Ser. No. 860,033, Sept. 22, 1969, abandoned.

[30] Foreign Application Priority Data

Dec. 22, 1969 United Kingdom............ 60322/69
July 27, 1970 United Kingdom............ 36199/70

[52] U.S. Cl. ............... 260/153; 260/154; 260/156
[51] Int. Cl.²... C09B 29/36; D06P 1/38; D06P 3/66
[58] Field of Search ............ 260/146 D, 146 T, 153, 260/154, 156

[56] References Cited
UNITED STATES PATENTS

| | | | |
|---|---|---|---|
| 2,431,190 | 11/1947 | Morgan............ | 260/156 X |
| 2,860,129 | 11/1958 | Gunst............... | 260/153 |
| 2,910,464 | 10/1959 | Fasciati et al...... | 260/153 |
| 3,135,731 | 6/1964 | Tilley et al......... | 260/153 |
| 3,438,962 | 4/1969 | Riat et al........... | 260/153 |
| 3,487,066 | 12/1969 | Ritter et al........ | 260/156 |
| 3,501,453 | 3/1970 | Steinemann....... | 260/156 |

Primary Examiner—Floyd D. Higel
Attorney, Agent, or Firm—Cushman, Darby & Cushman

[57] ABSTRACT

A new class of cellulose reactive dyes have a sulphonated benzene, naphthalene or azobenzene diazo component coupled on to a class of coupling components of the formula:

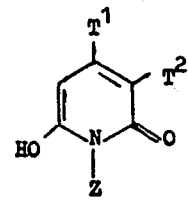

in which $T^1$ is H, phenyl, anisyl, $NH_2$, or lower alkyl, $T^2$ is H, CN, lower alkyl, $CONH_2$ or substituted aminocarbonyl, Z is R; HOR'—, ROR'—, $R_2NR'$—, phenyl or anisyl, (R and R' are lower alkyl and lower alkylene) the diazo component carrying a cellulose-reactive group. Also included are dyes in which the reactive group also contains an anthraquinone or phthalocyanine residue or where two moles of the dye are linked through a diamine radical. Cr and Co complexes of dyes in which the diazo component is a o-aminophenol are included.

9 Claims, No Drawings

WATER-SOLUBLE CELLULOSE REACTIVE AZO DYESTUFFS CONTAINING 3-AZO-2-HYDROXY-N-SUBSTITUTED PYRID-6-ONE RADICAL

This is a continuation of application Ser. No. 100,413 filed Dec. 21, 1970, and now abandoned, which in turn is a continuation-in-part of application Ser. No. 860,033, filed Sept. 22, 1969, now abandoned.

This invention relates to reactive dyestuffs and more particularly it relates to water-soluble azo dyestuffs containing fiber-reactive groups which are particularly valuable for coloring polyamide and cellulose textile materials.

It has been found that water-soluble compounds containing a sufficient number of sulphonic acid groups to provide water-solubility, one or more cellulose-reactive groups and at least one 3-azo-2-hydroxy-N-substituted-pyrid-6-one radical are valuable dyestuffs capable of affording deep shades of excellent fastness on cellulose, wool or polyamide textile materials. That is to say, the invention provides the novel concept of utilizing N-substituted 2-hydroxy-pyrid-6-one coupling components to form cellulose-reactive dyestuffs, the fiber-reactive group either being present in the components coupled together to form the dyestuff or being introduced into an azo dyestuff already containing the N-substituted 2-hydroxy-pyrid-6-one radical.

I. General Description of the new dyestuffs

The new dyestuffs may be characterized by the presence of at least one sulphonic acid group, at least one cellulose-reactive group and at least one group of the formula:

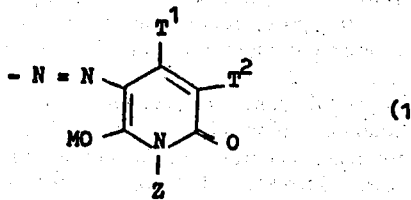

(1)

wherein Z represents an alkyl, aralkyl, cycloalkyl, aryl or heterocyclic radical which may be substituted or a group of the formula $-SO_2NR^1R^2$ wherein $R^1$ and $R^2$ each independently represents a hydrogen atom, an alkyl, aralkyl, cycloalkyl, aryl or heterocyclic radical which may be substituted or the group $-NR^1R^2$ represents the radical of a 5 or 6 membered heterocyclic ring compound; $T^1$ represents a hydrogen atom, a CN, $COOR^1$, $CONR^1R^2$, $COR^1$ or OH group or an alkyl, aralkyl, cycloalkyl, aryl or heterocyclic radical which may be substituted; $T^2$ represents a hydrogen atom a CN, $COOR^1$, $CONR^1R^2$ or $COR^1$ group or an alkyl, aralkyl, cycloalkyl, aryl or heterocyclic radical which may be substituted, and M represents a hydrogen atom or a metal atom forming part of a metal-complex system in the dyestuff.

One class of water-soluble azo dyestuffs of the invention may be represented by the formula:

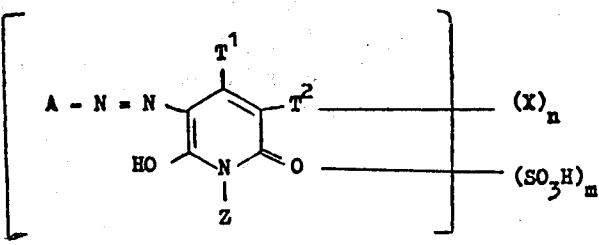

(2)

wherein A represents a benzene or naphthalene nucleus, X is a fiber-reactive group; Z, $T^1$, $T^2$, $R^1$ and $R^2$ have the meanings stated above; $n$ is a positive integer of at least 1 and $m$ is a positive integer of at least 1.

The azo dyestuffs of the invention can exist in a number of tautomeric forms; for convenience the dyestuffs have only been formulated in one of these tautomeric forms, but it is to be understood that this Specification relates to dyestuffs in any of the possible tautomeric forms.

The radical represented by A is a naphthalene nucleus or a benzene nucleus preferably carrying at least one sulphonic acid or carboxylic acid and optionally other substitutents such as chlorine, bromine, lower alkyl such as methyl, lower alkoxy such as methoxy, cyano, nitro, acetylamino or a fiber-reactive group X.

Yet a further class of dyestuffs of the invention are represented by formula (2) wherein A stands for a radical of the azo benzene, azonaphthalene or phenylazonaphthalene series.

The invention also relates to disazo dyestuffs which may be regarded as 2 molecules of the dyestuffs of formula (2) joined together through the radical A by a direct link or a bridging atom or group such as $-O-$, $-S-$, $-NH-$, $-CH=CH-$, $-OCH_2CH_2O-$, $-CONH-$ or $-NHCONH-$.

When the radical A contains a metallizable group, for example a hydroxy or carboxylic acid group, in ortho position to the azo group, then such dyestuffs can form metal complexes, and such metal complexes form further classes of dyestuffs of the invention.

The fiber-reactive group represented by X is a group whose presence in the dyestuff molecule renders the dyestuff capable of chemically combining with hydroxy groups present in cellulose textile materials or with amino groups present in polyamide textile materals. The fiber-reactive groups represented by X are attached to carbon atoms present in the dyestuff molecule and preferably to carbon atoms of aromatic rings, especially benzene rings, present in the dyestuff molecule.

As examples of fiber-reactive groups there may be mentioned acylamino radicals derived from olefinically unsaturated aliphatic carboxylic acids such as acryloylamino and crotonylamino, or from halogen-substituted aliphatic carboxylic acids such as β-chloropropionylamino, β-bromopropionylamino and β:γ:γ-trichlorocrotonylamino. Alternatively X can be a vinyl sulphone, β-chloroethyl sulphone, β-sulphatoethylsulphonyl, β-chloroethylsulphonamide or an optionally N-substituted β-aminoethylsulphonyl group.

The fiber-reactive group is preferably a heterocyclic radical having two or three nitrogen atoms in the heterocyclic ring and at least one labile substituent attached to a carbon atom of the heterocyclic ring. As examples of labile substituents there may be mentioned chlorine, bromine, quaternary ammonium groups, thiocyano, sulphonic acid, hydrocarbylsulphonyl groups, groups of the formula

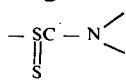

(3)

wherein the nitrogen atom carries optionally substituted hydrocarbon or heterocyclic radicals, and groups of the formula:

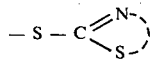

(4)

wherein the dotted line indicates the atoms necessary to form an optionally substituted or fused heterocyclic ring.

As specific examples of such fiber-reactive heterocyclic radicals there may be mentioned 2:3-dichloroquinoxaline-5- or -6-(sulphonyl or carbonyl-)amino, 2:4-dichloroquinazoline-6- or -7-sulphonylamino, 2:4:6-trichloroquinazoline-7- or -8-sulphonylamino, 2:4:7- or 2:4:8-trichloroquinazoline-6-sulphonylamino, 2:4-dichloroquinazoline-6-carbonylamino, 1:4-dichlorophthalazine-6-carbonylamino, 4:5 -dichloropyridazon-1-ylamino, 2:4 -dichloropyrimid-5-ylcarbonylamino, 1-(phenyl-4'-carbonylamino)4:5-dichloropyridazone, 1-(phenyl-4'-sulphonylamino)4:5-dichloropyridazone, 2:4- and/or 2:6-dichloro- or bromo-)pyrid-6 (and/or -4)ylamino, trichloropyrimidylamino, tribromopyridylamino, dichloro-5-(cyano, nitro, methyl or carbomethoxy)-pyrimidylamino, 2-methylsulphonyl-6-chloropyrimid-4-ylcarbonylamino and 5-chloro-6-methyl-2-methylsulphonyl pyrimid-4-ylamino, and more particularly 1:3:5-triazin-2-ylamino radicals which contain a bromine and, above all, a chlorine atom on at least one of the 4- and 6-positions, for example 4:6-dichloro-1:3:5-triazin-2-ylamino. When the triazine nucleus contains only a single chlorine atom then the third carbon atom of the triazine ring can be substituted by a hydrocarbon radical, such as methyl or phenyl, but more particularly by an optionally substituted hydroxy, mercapto or amino group, such as methoxy, phenoxy, α- and β-naphthoxy, methylmercapto, phenythio, methylamino, diethylamino, cyclohexylamino and anilino and N-alkylaniline and substituted derivatives thereof such as anisidine, toluidino, carboxylanilino, sulphoaniline, disulphoanilino and sulphonated naphthylamino.

If desired the fiber-reactive group can be of the type:

—NH—L¹—Q—L² wherein $L^1$ is a pyrimidine or triazine ring optionally carrying a labile atom or substituent, $L^2$ is a pyrimidine or triazine ring carrying at least one labile atom or substituent and Q is a bridging member which is linked to $L^1$ and $L^2$ through optionally substituted imino groups, said imino groups being linked together through an alkylene or arylene radical such as ethylene, 1:4-phenylene or 2-sulpho-1:4-phenylene.

Throughout the Specification the terms "lower alkyl" and "lower alkoxy" are used to denote alkyl and alkoxy radicals respectively containing from 1 to 4 carbon atoms.

The optionally substituted alkyl radicals represented by Z, $T^1$, $T^2$, $R^1$ and $R^2$ are preferably optionally substituted lower alkyl radicals, and as specific examples of such radicals there may be mentioned methyl, ethyl, n-propyl and n-butyl, hydroxy lower alkyl such as β-hydroxyethyl, lower alkoxy lower alkyl such as β-(methoxy or ethoxy)ethyl, cyano-methyl, carbamoyl-methyl, carbethoxy methyl and acetylmethyl.

As examples of aralkyl radicals represented by Z, $T^1$, $T^2$, $R^1$ and $R^2$ there may be mentioned benzyl and β-phenylethyl. As an example of cycloalkyl radicals represented by Z, $T^1$, $T^2$, $R^1$ and $R^2$ there may be mentioned cyclohexyl. The optionally substituted aryl radicals represented by Z, $T^1$, $T^2$, $R^1$ and $R^2$ are preferably optionally substituted phenyl radicals and as specific examples of such radicals there may be mentioned phenyl, tolyl, chlorophenyl, carboxyphenyl, methoxyphenyl and sulphophenyl. The optionally substituted heterocyclic radicals represented by Z, $T^1$, $T^2$, $R^1$ and $R^2$ are preferably optionally substituted 5- and 6-membered heterocyclic ring, and as specific examples of such radicals there may be mentioned 2-pyridyl, 2-thiazolyl, 1-piperidinyl and 1-morpholinyl.

As examples of 5- and 6-membered nitrogen-containing heterocylic rings formed by joining $R^1$, $R^2$ and the nitrogen atom there may be mentioned piperidine, morpholine, piperazine and pyrrolidine.

A preferred class of the azo dyestuffs of the invention comprises the dyestuffs which, in one of the possible tautomeric forms, are represented by the formula:

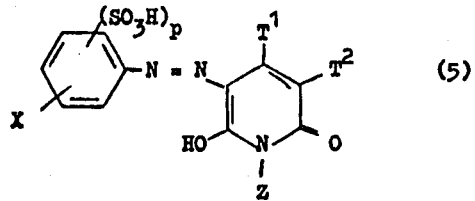

(5)

wherein $T^1$, $T^2$ and Z have the meanings stated, the fiber-reactive group represented by X is attached to the benzene ring in meta or para position to the azo group, and p is 1 or 2.

Within this generally preferred class, a number of particular meanings of the symbols $T^1$, $T^2$ and Z can be emphasized as being of special value. Thus Z is preferably selected from the class consisting of lower alkyl, hydroxy-lower alkyl, (lower alkoxy)-lower alkyl, (lower alkylamino)-lower alkyl, phenyl and anisyl; above all the preferred meaning of Z is ethyl. $T^1$ is preferably selected from the class consisting of H, lower alkyl, phenyl, anisyl, tolyl, $NH_2$, $NH_2$—CO, OH, $CO_2H$, lower alkoxy, lower alkoxycarbonyl, (aminocarbonyl)lower alkyl and (lower alkoxycarbonyl) lower alkyl; above all, the preferred meaning of $T^1$ is methyl. $T^2$ is preferably selected from the class consisting of H, CN, $CO_2H$, $CONH_2$, $NO_2$, $NH_2$, lower alkyl, phenyl, benzyl, chlorophenyl and lower alkoxycarbonyl; the preferred meanings of $T^2$ are H, CN and $CONH_2$.

Generally, the preferred meaning of X is one of the following:
β-sulphatoethylsulphonyl
β-sulphatoethylsulphonylamino
dichloropyrimidinylamino
trichloropyrimidinylamino
or a group of the formula:

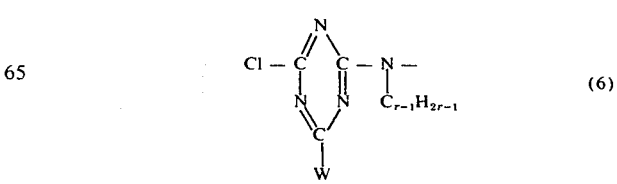

(6)

wherein r is 1 or 2, and W is a chlorine atom, an optionally substituted amino group or an etherified hydroxyl group.

A wide range of substituted amino groups can be represented by W in this formula. Of particular interest are the following: lower alkyl- and di-(lower alkyl)amino groups, e.g. methyl-, ethyl-, propyl- and iso-propyl-amino-, dimethyl-, diethyl-, N-ethyl-N-methyl-amino; hydroxyl- or lower alkoxy- substituted lower alkyl groups, e.g.:
β-hydroxyethylamino,
di-(β-hydroxyethylamino),
γ-methoxypropylamino,
β-ethoxyethylamino;
anilino groups which may contain as substituents $CH_3$, Cl, $OCH_3$, $CO_2H$ and/or $SO_3H$, e.g.:
o-, m- and p-sulphoanilino
2-methyl-4- and 5-sulphoanilino
2-chloro-4- and 5-sulphoanilino
2-methoxy-4- and 5-sulphoanilino
2-carboxy-4- and 5-sulphoanilino
2,4-, 2,5- and 3,5-disulphoanilino;
naphthylamine radicals containing 1, 2 or 3 $SO_3H$ groups, e.g.:
2,3,4,5,6,7 and 8-sulphonaphth-2-ylamino
1,3,4,5,6,7 and 8 -sulphonaphth-2-ylamino
3,6-, 4,8- and 3,8-disulphonaphth-1-ylamino
1,4-, 5,7- and 6,8-disulphonaphth-2-ylamino
3,6,8-trisulpho-naphth-1- and 2-ylamino;
N-alkylated anilino groups, e.g.:
N-methyl-m-sulphoanilino
N-ω-sulphomethylanilino
N-(β-hydroxyethyl)p-sulphoanilino.

Furthermore the group W can include within its scope groups which contain a chromophoric system linked to the carbon atom of the triazine ring through —NH— or —O—. Such chromophoric systems are preferably of the azo, anthraquinone or phthalocyanine series.

W can also represent the radical of a diamine in which the terminal N atom carries a chloro substituted s-triazine group, i.e. is represented by formula (6). That is to say, the fiber-reactive group X may be represented by the formula:

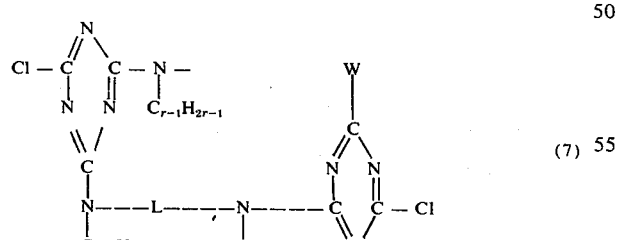

(7)

wherein r, p and q are each independently 1 or 2, W is a chlorine atom or an optionally substituted amino group or an etherified hydroxyl group, and L is a divalent bridging group in particular an optionally substituted alkylene or arylene (preferably phenylene) radical.

As particular examples of bridging groups represented by L there may be mentioned the N,N' divalent radicals of:
hydrazine,
piperazine,
ethylene, 1,2- and 1,3-propylene and 1,6-hexamethylene diamines,
1,3-phenylenediamine-4-sulphonic acid and 2,6-disulphonic acid, 1,4-phenylenediamine-2-sulphonic acid and 2,5-disulphonic acid,
1,3- and 1,4-phenylenediamines,
benzidine and benzidine-2,2'-disulphonic acid,
4,4'-diaminodiphenylurea and its 2,2'- and 3,3'-disulphonic acids,
3,3'-diaminodiphenylurea,
4,4'-diaminodiphenylmethane,
2,6-diaminonaphthalene-1,5-disulphonic acid,
1,5-diaminonaphthalene-3,7-disulphonic acid,
4,4'-diaminodiphenylsulphone,
4,4'-diaminodiphenylether,
4,4'-diaminostilbene-2,2'-disulphonic acid,
4,4'-diaminodiphenoxyethane-2,2'-disulphonic acid.

A particular case of dyes containing the group of formula 7 occurs when the symbol W represents the radical of an aminoazo compound of formula (5) i.e. where the dyestuff is a disazo compound having two identical monoazo compounds, each containing a monochloro-s-triazine group and linked together through the third carbon atoms of each triazine ring by a divalent bridging group.

As examples of etherified hydroxyl groups represented by W in formula (6) and (7), there may be mentioned lower alkoxy, e.g. methoxy, ethoxy, butoxy, lower alkoxy-substituted lower alkoxy, e.g. methoxyethoxy, ethoxyethoxy, γ-methoxypropoxy also phenoxy, tolyloxy, sulpho and disulphophenoxy groups.

II. Manufacture of the new dyestuffs

The new dyestuffs can be obtained by the conventional coupling and where necessary condensation and/or metallization reactions used for manufacture of cellulose-reactive dyestuffs characterized by use in the coupling stage of a N-substituted 2-hydroxy-pyrid-6-one compound.

Thus the metal-free azo dyestuffs of the invention may be obtained by diazotizing an amine of the formula A—$NH_2$ or tetrazatizing a diamine of the formula $NH_2$—A—$NH_2$ and coupling the resulting diazo compound with a coupling component which in one of the possible tautomeric forms is represented by the formula:

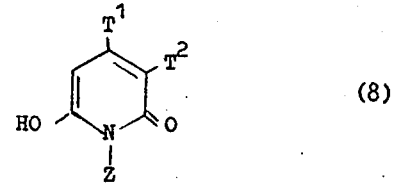

(8)

wherein A, $T^1$, $T^2$ and Z have the meanings stated above, the amine containing at least one fiber reactive group and at least one sulphonic acid group.

The diazotization and coupling stages of this process can be carried out in conventional manner, but are preferably carried out in an acid or at most weakly alkaline aqueous medium so as to reduce the possibility of hydrolysis of the fiber-reactive groups present.

Amines of the formula A-NH₂ which contain a fiber-reactive group can be obtained by condensing a compound of the formula X-halogen with the appropriate diamine, for example with 1:4-phenylenediamine-2:5-disulphonic acid, under such conditions that only one of the two amino groups reacts with the compound of the formula X-halogen.

Other suitable diamines for this purpose are: 1,3-phenylenediamine-4-sulphonic acid and 2,6-disulphonic acid, 1,4-phenylenediamine-2-sulphonic acid and 2,6-diaminonaphthalene-4,8-disulphonic acid.

The coupling components of Formula 8 can be obtained by a number of methods such as are described for example, in "Heterocyclic Compounds — Pyridine and its derivatives — Part 3" which was edited by Klingsberg and published by Interscience Publishers in 1962. Typical methods include, for example, (1) condensing together compounds of the formula T¹COCH₂COO alkyl and T²CH₂COO alkyl in the presence of an excess of an amine of the formula Z-NH₂, (2) cyclization of an α:β-disubstituted glutaconamide of the formula alkyl

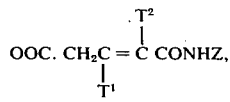

which is itself obtained by condensing together in the presence of a basic catalyst compounds of the formulae T¹COCH₂COO alkyl and T²CH₂CONHZ, or (3) cyclization of an α:β-disubstituted glutaconamide of the formula:

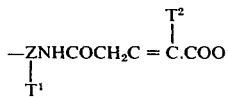

alkyl which is itself obtained by condensing together compounds of the formulae T¹COCH₂CONHZ and T²CH₂COO alkyl.

As specific examples of coupling compounds of formula (8) there may be mentioned:

| | |
|---|---|
| 1-methyl<br>1-ethyl<br>1-β-hydroxyethyl<br>1-γ-methoxypropyl<br>1-phenyl<br>1-p-tolyl<br>1-p-anisyl | -3-cyano-4-methyl-6-hydroxy-pyrimid-2-ones |
| 1-methyl<br>1-ethyl<br>1-β-hydroxyethyl<br>1-γ-methoxypropyl<br>1-phenyl<br>1-p-tolyl | -3-cyano-4-phenyl-6-hydroxyl-pyrid-2-ones |
| 1-p-anisoyl | -anisoyl |
| 1-β-hydroxyethyl<br>1-γ-methoxypropyl<br>3-aminocarbonyl<br>3-carboxy<br>3-ethoxycarbonyl | -3-cyano-4-ethyl-6-hydroxy-pyrid-2-ones<br>-1,4-diphenyl-6-hydroxypyrid-2-ones |
| 3-aminocarbonyl<br>3-carboxy<br>3-ethoxycarbonyl | -1-phenyl-4-methyl-6-hydroxy-pyrid-2-ones |

As examples of compounds of the formula X-halogen which can be reacted with amines of the formula A-NH₂ there may be mentioned acryloyl chloride, β-chloropropionyl chloride, β-bromo propionyl bromide, chloroacetyl chloride, α:β-dichloropropionyl chloride, 2:3-dichloroquinoxaline-5- or 6-carbonyl chloride, 2:3-dichloroquinazoline-5- or 6-sulphonyl chloride, 2:4-dichloroquinazoline-6- or 7-sulphonyl chloride, 2:4:6-trichloroquinazoline-7- or 8-sulphonyl chloride, 2:4:7- or 2:4:8-trichloroquinazoline-6-sulphonyl chloride, 2:4-dichloroquinazoline-6-carbonylchloride, 2:4-dichloropyrimidine-5-carbonyl chloride, 2-methylsulphonyl-6-chloropyrimidine-4-carbonyl chloride, β-(4:5-dichloropyridaz-6-on-1-yl)propionyl chloride, 1-(4'-chlorocarbonylphenyl)-4:5-dichloro-6-pyridazone, 1-(4'-chlorosulphonylphenyl)-4:5-dichloro-6-pyridazone, 2:4:6-trichloropyrimidine, 2:4:6-tri(chloro or bromo)-5-(methyl, nitro- or cyano-)pyrimidine, 2:4:5:6-tetrachloropyrimidine, 2:4-dichloro-5-nitro-6-methylpyrimidine, 5-carboethoxy-2:4:6-trichloropyrimidine, 2:4:6-tribromopyrimidine, 2:4:6-trifluoropyrimidine, cyanuric chloride, cyanuric bromide, the primary condensation products of cyanuric chloride with ammonia, amines, organic hydroxy or mercapto compounds, such as methanol, ethanol, phenol, α-naphthol, β-naphthol, chlorophenols, cresols, sulphonated phenols, thiophenol, thioglycollic acid, methyl mercaptan, dimethyldithiocarbamic acid, 2-mercaptobenzthiazole, thioacetamide, primary alkylamines such as methylamine, ethylamine, n-propylamine, dimethylamine and diethylamine, β-hydroxyethylamine, di(β-hydroxyethyl)amine, piperidine, morpholine, β-methoxyethylamine, aminoacetic acid, aniline, N-methylaniline, toluidine, anisidine, aniline-2:5-, 2:4- and 3:5-disulphonic acids, aniline o-, m- and p-sulphonic acid, N-methylaniline o-, m- and p-sulphonic acid, o-, m- and p-aminobenzoic acid, 4- and 5-sulpho-2-aminobenzoic acid, 2-aminotoluene-4-sulphonic acid, 5-amino-2-hydroxybenzoic acid, β-aminoethane sulphonic acid, N-methylaminoethane sulphonic acid and mono- and di-sulphonic acids of 1-amino- and 2-aminonaphthalene.

An alternative process for the manufacture of the azo dyestuffs of the invention which contain the fiber reactive group attached through an amino group comprises reacting an azo dyestuff of the formula:

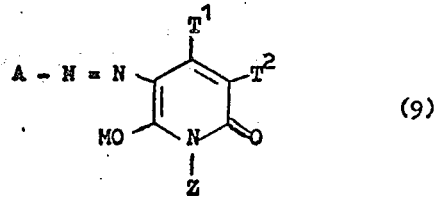

wherein A, M, T¹, T² and Z have the meanings stated above and in which A contains an amino group and at least one sulphonic acid group, with a compound of the formula: X-halogen, wherein halogen is chlorine or bromine and X has the meaning stated, one molecular proportion of the halogen compound being used for each amino or alkylamino group present in the dyestuff.

This alternative process of the invention can be conveniently carried out by stirring the azo dyestuff containing the amino group and the halogen compound together in water or in a mixture of water and a water-soluble organic liquid such as acetone, and gradually adding an acid binding agent such as sodium carbonate to neutralize the acid formed in the reaction. The resulting fiber-reactive dyestuff can then be isolated by conventional methods.

The said azo dyestuffs of the invention containing an amino group can themselves be obtained by diazotizing an amine of the formula A—NH₂ and coupling the resulting diazo compound with a coupling component of Formula 8, the amine containing a second amino group which is less readily diazotized or a group such as a nitro or acetylamino group which is readily converted to an amino group after coupling is complete. When it is desired to prepare metal complexes of the azo dyestuffs of the invention then it is preferred to prepare the metal complex of the corresponding dyestuff containing an amino group by treating the dyestuff with a solution of a metal compound, and subsequently reacting the metallized dyestuff containing an amino group with a compound of the formula X-halogen.

The new fiber-reactive azo dyestuffs of the invention which contain as the reactive group a 1:3:5-triazine nucleus substituted by a chlorine atom and by an optionally substituted amino group can also be obtained by reacting the corresponding dyestuff containing a 1:3:5-triazine nucleus substituted by two chlorine atoms with ammonia or the appropriate primary or secondary amine under such conditions that one of the chlorine atoms attached to the 1:3:5-triazine nucleus is replaced by an optionally substituted amino group.

The new fiber-reactive azo dyestuffs of the invention which contain as the reactive group a 1:3:5-triazine or pyrimidine nuclei substituted by a quaternary ammonium group or one or more

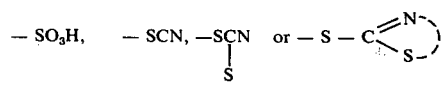

groups (as previously defined) can also be obtained by reacting the corresponding dyestuff containing one or more chlorine or bromine atoms attached to the 1:3:5-triazine or pyrimidine nuclei with a tertiary amine (such as trimethylamine and pyridine), an alkali metal sulphite, an alkali metal salt of a dithiocarbamate or an alkali metal salt of a 2-mercaptothiazole (such as 2-mercaptobenzthiazole).

The new reactive azo dyestuffs of the invention are particularly valuable for coloring cellulose textile materials, to which they are applied by dyeing, padding or printing processes in conjunction with a treatment with an alkaline agent. The dyestuffs have excellent build-up properties and the resulting colorations have excellent fastness to light and to the wet treatments which are commonly applied to cellulose textile materials.

The invention is illustrated but not limited by the following Examples in which parts and percentages are by weight.

SECTION A

This section describes the manufacture of examples of monoazo dyestuffs of the invention by coupling the diazonium salt of an amine containing a cellulose-reactive group with a 6-hydroxypyrid-2-one coupling component.

EXAMPLE 1

A solution of 7.4 parts of cyanuric chloride in 50 parts of acetone is added with stirring to 100 parts of water at 0° to 4°C. A solution of the sodium salt of 7.52 parts of 1:3-diaminobenzene-4-sulphonic acid in 120 parts of water is then added, the temperature of the mixture being maintained at 0° to 4°C by external cooling. After the reaction is complete the pH of the mixture is raised to between 6.5 and 7 by the addition of sodium carbonate and a solution of the sodium salt of 6.93 parts of metanilic acid in 100 parts of water is added. The mixture is then stirred for 4 hours at 30° to 40° while the pH of the mixture is maintained between 4.5 and 6 by the addition of sodium carbonate. The resulting solution is cooled to 0°C, 20 parts of a 2N aqueous solution of sodium nitrite are added, followed by 12 parts of a concentrated aqueous solution of hydrochloric acid. The mixture is stirred for 30 minutes and the excess nitrous acid is then destroyed by addition of sulphamic acid. The resulting mixture containing the diazo compound is added with stirring to a slightly alkaline solution of 7.13 parts of 1-ethyl-3-cyano-4-methyl-6-hydroxypyrid-2-one in 200 parts of water at 0° to 4°C, and the pH is adjusted to between 7.5 and 8.0. After coupling is completed, acetic acid is added to lower the pH to 6.0, the temperature is raised to 20°C, and the dyestuff precipitated by the addition of sodium chloride. The dyestuff is then filtered off and dried.

When applied to cotton and viscose rayon textile materials in conjunction with a treatment with an acid-binding agent the dyestuff yields bright greenish-yellow shades having excellent fastness to wet treatments such as washing and to light.

EXAMPLE 2 TO EXAMPLE 153

The following Table depicts further examples of the invention obtained in similar manner to Example 1 by condensing the diamine used in column II with one mole of the acid chloride compound named in column I and diazotizing and coupling the resultant amino compound with the coupling component named in column III. The shade of dyestuff obtained is stated in the final column.

| Example | I | II | III | IV Shades |
|---|---|---|---|---|
| 2 | cyanuric chloride | 1,3-diaminobenzene-4,6-disulphonic acid | 1-ethyl-3-cyano-4-methyl-6-hydroxypyrid-2-one | Greenish-yellow |
| 3 | do. | do. | 1-β-hydroxyethyl-3-cyano-4-methyl-6-hydroxypyrid-2-one | do. |
| 4 | do. | do. | 1-isopropyl-3-cyano-4-methyl-6-hydroxypyrid-2-one | do. |
| 5 | do. | 1,4-diaminobenzene-3,6-disulphonic acid | 1-ethyl-3-cyano-4-methyl-6-hydroxypyrid-2-one | Reddish-yellow |
| 6 | do. | do. | 1-β-hydroxyethyl-3-cyano-4-m35hyl-6-hydroxypyrid-2-one | do. |
| 7 | 2,4-dichloro-6-m- | 1,4-diaminobenzene-3,6- | do. | do. |

-continued

| Example | I | II | III | IV Shades |
|---|---|---|---|---|
| | sulphoanilino-s-triazine | disulphonic acid | | |
| 8 | do. | do. | 1-ethyl-3-cyano-4-methyl-6-hydroxypyrid-2-one | do. |
| 9 | do. | 1,3-diaminobenzene-4,6-disulphonic acid | do. | Greenish-yellow |
| 10 | do. | do. | 1-β-hydroxyethyl-3-cyano-4-methyl-6-hydroxypyrid-2-one | do. |
| 11 | do. | do. | 1-isopropyl-3-cyano-4-methyl-6-hydroxypyrid-2-one | do. |
| 12 | do. | 2,6-diaminonaphthalene-4,8-disulphonic acid | 1-ethyl-3-cyano-4-methyl-6-hydroxypyrid-2-one | Orange |
| 13 | 2,4-dichloro-6-N-m-sulphomethylanilino-s-triazine | 1,3-diaminobenzene-4,6-disulphonic acid | 1-ethyl-3-cyano-4-methyl-6-hydroxypyrid-2-one | Greenish-yellow |
| 14 | 2,4-dichloro-6-N-methyl-m-sulphoanilino-s-triazine | do. | do. | do. |
| 15 | 2,4-dichloro-6-(2'-methyl-5'-sulpho)-anilino-s-triazine | do. | do. | do. |
| 16 | 2,4-dichloro-6-(2',5'-disulpho)anilino-s-triazine | do. | do. | do. |
| 17 | 2,4-dichloro-6-(3',6',8'-trisulpho)-naphth-2'-ylamino-s-triazine | do. | do. | do. |
| 18 | 4,5-dichloro-6-methyl-2-methyl-sulphonylpyrimidine | do. | do. | do. |
| 19 | 2,3-dichloroquinoxaline-6-carbonyl chloride | do. | do. | do. |
| 20 | β-(4,5-dichloropyridaz-3-onyl)-1-propionyl chloride | do. | do. | do. |
| 21 | β-acetoxypropionyl chloride | do. | do. | do. |
| 22 | acryloyl chloride | do. | do. | do. |
| 23 | β-phenylsulphonyl-propionyl chloride | do. | do. | do. |
| 24 | 3,6-dichloropyridazine-4-carbonyl chloride | do. | do. | do. |
| 25 | 2,4,6-trichloro-pyrimidine | do. | do. | do. |
| 26 | 2,4,5,6-tetrachloro-pyrimidine | do. | do. | do. |
| 27 | 5-bromo-2,4,5-tri-chloropyrimidine | do. | do. | do. |
| 28 | 5-cyano-2,4,5-tri-chloropyrimidine | do. | do. | do. |
| 29 | 2,4-dichloropyrimidine-5-carbonyl chloride | do. | do. | do. |
| 30 | 2,4-dichloropyrimidine-5-sulphonyl chloride | do. | do. | do. |
| 31 | 2-chlorobenzthiazole-6-carbonyl chloride | do. | do. | do. |
| 32 | 1,4-dichlorophthalazine-6-carbonyl chloride | do. | do. | do. |
| 33 | β-bromopropionyl bromide | do. | do. | do. |
| 34 | cyanuric chloride | do. | 1,4-dimethyl-3-cyano-6-hydroxypyrid-2-one | do. |
| 35 | 2,4-dichloro-6-p-sulpho-anilino-s-triazine | do. | do. | do. |
| 36 | 2,4-dichloro-6-(3',5'-disulpho)anilino-s-triazine | 1,4-phenylenediamine-2-sulphonic acid | do. | Reddish-yellow |
| 37 | 2,4-dichloro-6-m-sulphoanilino-s-triazine | 1,3-phenylenediamine-4,6-disulphonic acid | 1-cyclohexyl-3-cyano-4-methyl-6-hydroxypyrid-2-one | Greenish-yellow |
| 38 | do. | do. | 1-γ-methoxypropyl-3-cyano-4-methyl-6-hydroxy-pyrid-2-one | do. |
| 39 | do. | do. | 1-β-dimethylaminoethyl-3-cyano-4-methyl-6-hydroxy-pyrid-2-one | do. |
| 40 | do. | do. | 1,4-diphenyl-6-hydroxy-pyrid-2-one | do. |
| 41 | do. | do. | 1-(4'-methoxyphenyl)-4-methyl-6-hydroxypyrid-2-one | do. |
| 42 | do. | do. | 1-phenyl-4-(4'-methoxy-phenyl)-6-hydroxypyrid-2-one | do. |
| 43 | do. | do. | 1-methyl-3-cyano-4- | do. |

-continued

| Example | I | II | III | IV Shades |
|---|---|---|---|---|
| | | | phenyl-6-hydroxypyrid-2-one | |
| 44 | do. | do. | 1-ethyl-3-cyano-4-amino-6-hydroxypyrid-4-one | do. |
| 45 | 1-(4'-chloro-carbonylphenyl)-4,5-dichloro-pyridaz-6-one | do. | 1-ethyl-3-cyano-6-hydroxy-4-methyl-pyrid-2-one | do. |
| 46 | 2,3-dibromo-propionyl chloride | do. | 1-ethyl-3-aminocarbonyl-4-methyl-6-hydroxy-pyrid-2-one | do. |
| 47 | tetrafluorocyclo-butane carbonyl chloride | do. | do. | do. |
| 48 | trifluoro cyclo-butene carbonyl chloride | do. | do. | do. |
| 49 | β-(tetrafluoro cyclo-butyl)acryloyl chloride | do. | do. | do. |
| 50 | β-(trifluorocyclo-butenyl)acryloyl chloride | do. | do. | do. |
| 51 | 2,4-dichloro-6-(m-sulphoanilino)-s-triazine | do. | do. | do. |
| 52 | 2,4-dichloro-6-(m-sulphoanilino)-s-triazine | 1,3-phenylenediamine-4,6-disulphonic acid | 1-methyl-3-aminocarbonyl-4-methyl-6-hydroxy-pyrid-2-one | do. |
| 53 | do. | do. | 1-n-propyl-3-amino-carbonyl-4-methyl-6-hydroxypyrid-2-one | do. |
| 54 | do. | 1,4-phenylenediamine 2,5-disulphonic acid | 1-ethyl-3-aminocarbonyl-4-methyl-6-hydroxypyrid-2-one | Reddish-yellow |
| 55 | cyanuric chloride | do. | do. | do. |
| 56 | 2,4-dichloroquinazo-line-5-carbonyl-chloride | do. | do. | do. |
| 57 | 2,4-dichloropyrimidine-5-carbonyl chloride | 1,3-phenylenediamine-4,6-disulphonic acid | do. | Greenish-yellow |
| 58 | 2,4,5,6-tetrachloro-pyrimidine | do. | do. | do. |
| 59 | 2,3-dichloroquin-oxaline-6-carbonyl chloride | do. | do. | do. |
| 60 | 2,4-dichloro-6-(2'-methyl-5'-sulpho-anilino)-s-triazine | do. | do. | do. |
| 61 | do. | do. | 1-n-butyl-3-aminocarbonyl 4-methyl-6-hydroxy-pyrid-2-one. | do. |
| 62 | cyanuric chloride | do. | do. | do. |
| 63 | 2,4-dichloro-6-methoxy-s-triazine | do. | do. | do. |
| 64 | do. | do. | 1-ethyl-3-aminocarbonyl-4-methyl-6-hydroxypyrid-2-one | do. |
| 65 | 2,4-dichloro-6-(2',5'-disulphoanilino)-s-triazine | 1,3-phenylenediamine-4-sulphonic acid | do. | do. |
| 66 | 2,4-dichloro-6-(3'-sulphoanilino)-s-triazine | do. | do. | do. |
| 67 | cyanuric chloride | 1,4-phenylenediamine-2,5-disulphonic acid | 1-n-butyl-3-aminocarbonyl-4-methyl-6-hydroxypyrid-2-one | Reddish-yellow |
| 68 | 2,4-dichloro-6-amino-s-triazine | 1,3-phenylenediamine-4,6-disulphonic acid | 1-ethyl-3-aminocarbonyl-4-methyl-6-hydroxypyrid-2-one | Greenish-yellow |
| 69 | 2,4-dichloro-6-ethyl-amino-s-triazine | do. | do. | do. |
| 70 | cyanuric chloride | do. | do. | do. |
| 71 | do. | do. | 1-ethyl-4-methyl-6-hydroxypyrid-2-one | do. |
| 72 | do. | do. | 1-γ-methoxypropyl-3-aminocarbonyl-4-methyl-6-hydroxypyrid-2-one | do. |
| 73 | do. | do. | 1-isopropyl-3-amino-carbonyl-4-methyl-6-hydroxypyrid-2-one | do. |
| 74 | do. | do. | 1-ethyl-3-(N'-phenyl-aminocarbonyl)-4-methyl-6-hydroxypyrid-2-one | do. |
| 75 | 2,4-dichloro-6-(m-sulphoanilino)-do. | do. | do. | |
| 76 | do. | do. | 1,4-dimethyl-3-amino-carbonyl-6-hydroxy- | do. |

-continued

| Example | I | II | III | IV Shades |
|---|---|---|---|---|
| 77 | do. | do. | pyrid-2-one 1,4-diphenyl-3-aminocarbonyl-6-hydroxy-pyrid-2-one | do. |
| 78 | do. | do. | 1,4-dimethyl-6-hydroxy-pyrid-2-one | do. |
| 79 | do. | do. | 1-phenyl-3-aminocarbonyl-4-methyl-6-hydroxypyrid-2-one | do. |
| 80 | 2,4-dichloro-6-βdo. | 1,4-dimethyl-3-(N'-ethyl-N'-phenylaminocarbonyl)-6-hydroxy-pyrid-2-one | do. | |
| 81 | do. | do. | 1-ethyl-3-(N'-benzyl-aminocarbonyl)-4-methyl-6-hydroxypyrid-2-one | do. |
| 82 | 2,4-dichloro-6-(2'-methyl-5'-sulpho-anilino)-s-triazine | 1,3-phenylenediamine-4-sulphonic acid | 1-ethyl-4-methyl-6-hydroxypyrid-2-one | do. |
| 83 | do. do. | do. | 1-γ-methoxypropyl-3-aminocarbonyl-4-methyl-6-hydroxypyrid-2-one | |
| 84 | do. | 2,6-naphthalenediamine-4-8-disulphonic acid | 1-ethyl-3-aminocarbonyl-4-methyl-6-hydroxy-pyrid-2-one | Reddish-yellow |
| 85 | 2,4-dichloro-6-(2',5'-disulphoanilino)-s-triazine | do. | do. | do. |
| 86 | do. | do. | 1-ethyl-4-methyl-6-hydroxypyrid-2-one | do. |
| 87 | cyanuric chloride | do. | 1-γ-methoxypropyl-3-aminocarbonyl-4-methyl-6-hydroxypyrid-2-one | do. |
| 88 | 2,4-dichloro-6-(2'-methyl-5'-sulpho-anilino)-s-triazine | 1,3-phenylenediamine-4-sulphonic acid | 1-ethyl-3-aminocarbonyl-4-methyl-6-hydroxypyrid-2-one | Greenish-yellow |
| 89 | 2,4-dichloro-6-(4'-sulphoanilino)-s-triazine | 1,3-phenylenediamine-4,6-disulphonic acid | do. | do. |
| 90 | 2,4-dichloro-6-amino-s-triazine | do: | 1-ethyl-3-cyano-4-methyl-6-hydroxypyrid-2-one | do. |
| 91 | 2,4-dichloro-6-β-hydroxypropylamino-s-triazine | do. | do. | do. |
| 92 | 2,4-dichloro-6-amino-s-triazine | do. | 1-β-hydroxyethyl-3-cyano-4-methyl-6-hydroxy-pyrid-2-one | do. |
| 93 | 2,4-dichloro-6-(2'-methyl-5'-sulpho-anilino)-s-triazine | 1,4-phenylenediamine-2,5-disulphonic acid | 1-ethyl-3-aminocarbonyl-4-methyl-6-hydroxypyrid-2-one | Reddish-yellow |
| 94 | 2,4-dichloro-6-methoxy-s-triazine | do. | do. | do. |
| 95 | 2,4-dichloro-6-μ-hydroxyethylamino-s-triazine | 1,3-phenylenediamine-4-sulphonic acid | do. | Greenish-yellow |
| 96 | cyanuric chloride | 1,4-phenylenediamine-2,5-disulphonic acid | 1-ethyl-4-methyl-6-hydroxypyrid-2-one | Reddish-yellow |
| 97 | 2,4-dichloro-6-(m-sulphoanilino-s-triazine | do. | do. | do. |
| 98 | 2,4-dichloro-6-(2'-methyl-4'-sulpho-anilino)-s-triazine | 1,3-phenylenediamine-4,6-disulphonic acid | do. | Greenish-yellow |
| 99 | 2,4-dichloro-6-(4'-sulphoanilino)-s-triazine | do. | do. | do. |
| 100 | 2,4-dichloro-6-β-hydroxyethylamino-s-triazine | do. | do. | do. |
| 101 | 2,4-dichloro-6-(4'-sulphophenoxy)-s-triazine | do. | do. | do. |

The 1-alkyl-3-aminocarbonyl-4-methyl-6-hydroxypyrid-2-ones used in the above examples are believed to be novel. They may be obtained by hydrolysis of the corresponding 3-cyano compound by treatment with acid. A typical preparation of 1-ethyl-3-aminocarbonyl-4-methyl-6-hydroxypyrid-2-one is as follows:

60 parts of powdered 1-ethyl-3-cyano-4-methyl6-hydroxypyrid-2-one are added to 330 parts of stirred 100% sulfuric acid during 1 hour, the temperature of the mixture not being permitted to rise above 20°C. during this time. The mixture is then stirred at 50°–55°C. for 24 hours and the resulting clear solution poured onto 600 parts of crushed ice. The white precipitate is collected by filtration and washed by slurring with 5 % brine solution until the washings are no longer acid to Congo Red indicator paper. The product, after drying in vacuo over phosphorus pentoxide melts with decomposition at 164° and is found to contain 14.1 % N ($C_9H_{12}N_2O_3$ req N = 14.3 %). Recrystallization from alcohol gives well formed prisms melting at 164° with decomposition, analysis now giving C = 54.6 %, H = 6.2 %, N = 14.2 %, M.W. by mass spectrum 196 ($C_9H_{12}N_2O_3$ req. C = 55.1 %, H = 6.2 %, N = 14.3 %, M.W. 196).

SECTION B

This section describes the manufacture of examples of monoazo dyestuffs of the invention by introducing the cellulosereactive groups into a compound of formula (9) above.

EXAMPLE 102

A solution of 6.7 parts of 1,4-phenylenediamine-2,5-disulphonic acid in 100 parts of hydrochloric acid (36°Tw) at 0°–50°C. is diazotized by the dropwise addition of 1.73 parts of sodium nitrate dissolved in 12.5 parts of water.

The diazonium solution so formed is then added to a stirred solution of 4.5 parts of 1-ethyl-3-cyano-4-methyl-6-hydroxypyrid-2-one in 250 parts of water at pH 7.0 and 0°–5°C. The pH of the solution is maintained at 6–7 with 10 % sodium carbonate solution as required and the mixture stirred at 0°–5°C. for 5 hours.

To the solution is then added dropwise, a solution of 4.7 parts of cyanuric chloride in 30 parts of acetone and the mixture stirred at 0°–5°C. for 2 hours maintaining the pH at 6–7 with 10 % sodium carbonate solution as required. The dyestuff is precipitated by addition of sodium chloride and filtered off. The precipitate is intimately mixed with 1 part of anhydrous disodium hydrogen phosphate and 1.9 parts of anhydrous potassium dihydrogen phosphate, and dried at a temperature between 20°C. and 30°C.

When applied to cellulosic materials, the dyestuff obtained gives reddish yellow shades which are fast to washing and to light.

EXAMPLE 103

A mixture of 12.0 parts of 6-acetylamino-2-aminonaphthalene-4,8-disulphonic acid and 10 parts 36°Tw hydrochloric acid in 150 parts of water at 0°–5°C is diazotized by the addition of 17 parts of 2N sodium nitrite solution. Slight excess of nitrous acid is removed by addition of 10% aqueous sulphamic acid solution as required and the diazo suspension is added to a solution of 7.0 parts 3-aminocarbonyl-1-ethyl-6-hydroxy-4-methylpyrid-2-one in 250 parts of water at 0°–5°C. The pH of the mixture is adjusted to 7.0 by addition of 2N sodium carbonate solution and the mixture stirred at 0°–5°C and pH 7.0 for 3 hours. The monoazo compound is filtered off and dried at 40°C under vacuum.

15 parts of the monoazo compound prepared above are stirred at the boil under a reflux condenser in 700 parts of water. To the mixture is added 160 parts of 36°Tw hydrochloric acid and the mixture is then boiled for 45 minutes. The mixture is cooled to 10°C., the precipitated aminoazo compound filtered off, washed with 150 parts of water and dried.

To a solution of 13.12 parts of the aminoazo compound prepared above in 300 parts of water at 35°–40°C and pH 7.0 is added 6.44 parts of 2,4-dichloro-6-β-sulphoethyl-amino-s-triazine in 50 parts of water and the mixture stirred at 35°–40°C for 5 hours maintaining the pH at 6–7 by addition of 2N sodium carbonate solution as required.

The dyestuff is precipitated by addition of potassium chloride and dried at 40°C.

When applied to cotton and viscose rayon textile material in the presence of an acid binding agent it yields orange shades which have excellent fastness to wet treatments and to light.

If in place of the 2,4-dichloro-6-β-sulphoethylamino-s-triazine used above there are used an equivalent amount of any of the following:

Example 104. 2,4-dichloro-6-(3',8'-disulpho naphth-1'-ylamino)-s-triazine,
105. 2,4-dichloro-6-(4',8'-disulpho naphth-1'-ylamino)-s-triazine,
106. 2,4-dichloro-(5',7'-disulpho-naphth-2'-ylamino)-s-triazine,
107. 2,4-dibromo-(5',7'-disulpho naphth-2'-ylamino)-s-triazine,
108. 2,4-dichloro(6',8'-disulpho naphth-2'-ylamino)-s-triazine,
109. 2,4-dibromo-(6',8'-disulpho-naphth-2'-ylamino)-s-triazine,
110. 2,4-dichloro-6-n-propoxy-s-triazine,
111. 2,4-dichloro-6-isopropoxy-s-triazine,
112. 2,4-dichloro-6-(β-ethoxy)-ethoxy-s-triazine, dyestuffs similar in shade and with excellent fastness to wet treatments and to light are obtained.

EXAMPLES 113 TO 132

If an equivalent amount of 4-acetylaminoaniline-2,5-disulphonic acid is used in place of 6-acetylamino-2-aminonaphthalene4,8-disulphonic acid in each of Examples 104 to 112 there are obtained dyestuffs (Examples 113 to 122) which give reddish-yellow shades when applied to cellulose with good fastness to washing and to light.

Alternatively an equivalent amount of 3-acetylaminoaniline-6-sulphonic acid may be used, which, after coupling, hydrolysis, and condensation with any of the dibromo- or dichlor-s-triazines used in Examples 104 to 112, provide dyestuffs (Examples 123 to 132) which give greenish-yellow shades on cellulose with good fastness to washing and to light.

SECTION C

This section describes the manufacture of monoazo dyestuffs of the invention which contain as the reactive group or groups one or more 1:3:5-triazine nuclei substituted by a chlorine atom and by an optionally substituted amino group by reacting the corresponding dyestuff containing at least one 1:3:5-triazine nucleus substituted by two chlorine atoms with ammonia or the appropriate primary or secondary amine under such conditions that one of the chlorine atoms attached to each 1:3:5-triazine nucleus is replaced by an optionally substituted amino group.

In general this replacement can be effected by heating a mixture of ammonia or the amine and the dyestuff in aqueous solution at from about 30° to about 60°C., maintaining the pH of the solution at from 6 to 8 by addition of an alkali to neutralize the liberated hydrogen chloride as it is formed. In the case of aliphatic or other amino compounds of similar basicity, an excess of the amine can be used, the excess acting as acid-binding agent.

This process is illustrated by the following Examples in which parts are by weight.

EXAMPLE 133

A solution of the sodium salt of 26.8 parts of 1,4-diaminobenzene-2,5-disulphonic acid in 500 parts of water is mixed with 50 parts of 2N sodium nitrite solution and cooled to 0° to −3°C. 30 Parts of concentrated hydrochloric acid are then added and the diazonium salt is stirred for 30 minutes at 0°C. Any residual nitrous acid is destroyed by the addition of sulphamic acid. The diazonium chloride so obtained is added to a neutral solution of 17.8 parts of 1-ethyl-3-cyano-4-methyl-6-hydroxypyrid-2-one in 600 parts of water at 0°–4°C. with stirring and the pH adjusted slowly to 7 — 7.5 until the coupling has been accomplished. The solution so obtained is mixed with 18.5 parts of powdered cyanuric chloride at 0°–8°C. and the mixture stirred at pH 5–6 until the amino group of the azo-compound has completely reacted. The solution containing the dichloro-s-triazinyl dye is mixed with a solution of the sodium salt of 17.5 parts of sulphanilic acid in 200 parts of water and the mixture stirred at pH 5–6, at 30°–40°C. until one chlorine atom of the dichloro-s-triazinyl dye has completely reacted. The dyestuff is precipitated by the addition of sodium chloride, filtered off and dried.

When applied to cotton and viscose rayon textile materials the dyestuff yields bright reddish-yellow shades having excellent fastness to wet treatments such as washing and to light.

EXAMPLE 134

In a manner similar to Example 1, 6.7 parts of 1,3-phenylenediamine-4,6-disulphonic acid dissolved in 50 parts of water at 0°–5°C and pH 5.0 is condensed with 4.63 parts of cyanuric chloride in a mixture of 25 parts of acetone, 50 parts of ice and 50 parts of water, and the product is diazotized and coupled with 4.9 parts of 3-aminocarbonyl-1-ethyl 6-hydroxy-4-methylpyrid-2-one dissolved in 150 parts of water at pH 7.0 and 0°–5°C. The mixture is stirred at 0°–5°C for 2 hours maintaining the pH at 6–7 with 2 N sodium carbonate solution as required. To the solution 2.5 parts of aniline are added, and the solution heated to 35°–40°C. for 3 hours maintaining the pH at 6 – 7 with 2N sodium carbonate solution as required. The dyestuff is isolated by total liquor spray drying, and when applied to cotton and viscose rayon textile materials in conjunction with a treatment with an acid-binding agent it yields bright greenish-yellow shade having excellent fastness to wet treatments such as washing and to light.

The following table describes further examples of monoazo dyestuffs obtained in a similar manner to Example 133 by mono-diazotization of the diamine named in column II, coupling with the pyridone of column III, condensing with cyanuric chloride and then with the amine of column IV, or in similar manner to Example 134 by first condensing the diamine with cyanuric chloride, diazotized and coupling with the pyridone and then condensing with 1 mole of the amine. In the examples 148 to 158, it is more convenient to use a substantial excess, e.g. 5 moles, of the amine and exclude the addition of sodium carbonate.

| Example | II | III | IV | Shade |
|---|---|---|---|---|
| 135 | 1,3-diaminobenzene-4,6-disulphonic acid | 1-ethyl-3-cyano-4-methyl-6-hydroxypyrid-2-one | sulphanilic acid | greenish yellow |
| 136 | " | 1-ethyl-3-aminocarbonyl-4-methyl-6-hydroxypyrid-2-one | p-aminobenzoic acid | " |
| 137 | " | " | anthranilic acid | " |
| 138 | " | " | metaaminobenzoic acid | " |
| 139 | " | " | 4-sulpho-2-amino benzoic acid | " |
| 140 | " | " | 5-sulpho-2-amino benzoic acid | " |
| 141 | " | " | o-anisidine | " |
| 142 | " | " | cresidine | " |
| 143 | " | " | 4-sulpho-2-amino anisole | " |
| 144 | " | " | 5-sulpho-2-amino anisole | " |
| 145 | " | " | 4-sulpho-2-chloro-aniline | " |
| 146 | " | " | 5-sulpho-2-chloro-aniline | " |
| 147 | " | " | 4-sulpho-N-methyl aniline | " |
| 148 | " | " | methylamine | " |
| 149 | " | " | n-propylamine | " |
| 150 | " | " | iso-propylamine | " |
| 151 | " | " | n-butylamine | " |
| 152 | " | " | β-methoxyethyl amine | " |
| 153 | " | " | diethyl amine | " |
| 154 | " | " | di-(β-hydroxyethyl) amine | " |
| 155 | " | " | morpholine | " |
| 156 | " | " | cyclohexylamine | " |
| 157 | " | " | benzyl amine | "/ |
| 158 | " | " | hydrazine | " |
| 159 | " | " | 5-sulpho-2-naphthyl-amine | " |
| 160 | " | " | 6-sulpho-2-naphthyl amine | " |
| 161 | " | " | 8-sulpho-1-naphthyl amine | " |
| 162 | " | " | 4-sulpho-1-naphthyl amine | " |
| 163 | " | 1-ethyl-4-methyl-6-hydroxy pyrid-2-one | 2-sulpho-1-naphthyl amine | " |

| Example | II | III | IV | Shade |
|---|---|---|---|---|
| 164 | " | " | 1-sulpho-2-naphthyl amine | " |
| 165 | " | " | 5-sulpho-2-naphthyl amine | " |
| 166 | " | " | 6-sulpho-2-naphthyl amine | " |
| 167 | " | 3-aminocarbonyl-1,4-dimethyl-6-hydroxypyrid-2-one | amine | " |
| 168 | " | " | 4-sulpho-2-naphthyl amine | " |
| 169 | " | " | 7-sulpho-2-naphthyl amine | " |
| 170 | " | 3-aminocarbonyl-1-n-propyl-6-hydroxypyrid-2-one | 5-sulpho-1-naphthyl amine | " |
| 171 | " | " | 7-sulpho-1-naphthyl amine | " |
| 172 | " | " | 3-sulpho-2-naphthyl amine | " |
| 173 | " | 1,4-dimethyl-6-hydroxy pyrid-2-one | 6-sulpho-1-naphthyl amine | " |
| 174 | " | " | 8-sulpho-2-naphthyl amine | " |
| 175 | " | 1-ethyl-3-cyano-4-methyl-6-hydroxypyrid-2-one | 1-amino-4-(4'-amino anilino)anthraquinone-2,3',5-trisulphonic acid | green |
| 176 | 1,4-diamino benzene-2,5-disulphonic acid | " | 1-amino-4-(3'-amino anilino)anthraquinone-2,4'-disulphonic acid | olive |
| 177 | " | " | copper phthalocyanine-mono-3-(4'-amino-3'-sulphopherylamino-sulphonyl)tri-3-sulphonic acid | dull green |

EXAMPLE 178

A solution of 23.4 parts of 2-amino-6-nitrophenol-4-sulphonic acid in 450 parts of water containing 50 parts of 2N aqueous sodium nitrite is added to 150 parts of 2N hydrochloric acid at 0°–4°C to give a yellow diazonium salt solution. This is added to a neutral solution of 17.8 parts of 1-ethyl-3-cyano-4-methyl-6-hydroxypyrid-2-one in 500 parts of water and pH raised slowly to 7.5 by the addition of 2N sodium hydroxide. The yellow azo dyestuff is then reacted with 20 parts of chromium acetate at pH 5.5 – 6.0 by heating at 95° – 100°C for 1 hour. The red solution of 2:1-chromium complex is filtered and treated with 40 parts of sodium sulphide crystals added portionwise over 1 hour at 90°C/pH 7 – 8. The mixture is filtered, cooled acidified with 50 parts of concentrated hydrochloric acid to Congo Red at the 2:1-chromium complex isolated by the addition of salt, filtration and washing with a little acetone.

16.1 Parts of the above 2:1-chromium complex is reacted with 7.4 parts cyanuric chloride at 0°–5°C/pH 5–6 and 7.0 parts of metanilic acid at 30° – 40°C/pH 5.0 – 6.5 to give a dyestuff dyeing and printing cotton and viscose rayon in brick-red shades having excellent fastness to washing and light. The corresponding 1:2Co complex gives dull scarlet shades.

EXAMPLE 179

In place of 23.4 parts of 2-amino-6-nitrophenol-4-sulphonic acid used in Example 178 there are used 23.4 parts of 2-amino-4-nitrophenol -6-sulphonic acid whereby a similar dyestuff is obtained.

EXAMPLE 180

In place of 7.0 parts of metanilic acid used in Example 178 there are used 8 parts of 0.88 ammonia at 30°–40°/pH 8.5—9.0 whereby a similar dyestuff is obtained.

SECTION D

This section describes the manufacture of monoazo dyestuffs of the invention which contain as the reactive group one or more 1:3:5-triazine or pyrimidine nuclei substituted by a quaternary ammonium group or one or more —SO₃H,

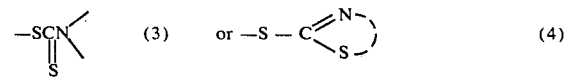

groups, as previously defined herein, by reacting the corresponding dyestuff containing one or more chlorine or bromine atoms attached to the 1:3:5-triazine or pyrimidine nuclei with a tertiary amine, e.g. trimethylamine and pyridine, an alkali metal sulphite, an alkali metal salt of a dithiocarbamate e.g. sodium dimethyl-, diethyl-, diphenyl- or pentamethylene-dithiocarbamate or an alkali metal salt of a 2-mercaptothiazole e.g. 2-mercaptobenzthiazole, 2-mercapto-6-methoxybenzthiazole or 2-mercapto-6-methoxybenzthiazole or 2-mercapto-6-sulphobenzthiazole.

This process can conveniently be carried out by stirring a mixture of the dyestuff and the co-reactant in aqueous solution at a temperature, an appropriate, from 20° to 80°C. followed by isolation in a conventional manner, e.g. by spray-drying the reaction mixture in which the dyestuff has been formed, or by precipitation by salting followed by filtration of the precipitated dyestuff.

This process is illustrated by the following Examples in which parts are by weight.

EXAMPLE 181

A solution of 7.4 parts of cyanuric chloride in 50 parts of acetone is added with stirring to 100 parts of water at 0° to 4°C. A solution of the sodium salt of 7.52 parts of 1:3-diaminobenzene-4-sulphonic acid in 120 parts of water is then added, the temperature of the mixture being maintained at 0° to 4°C. by external cooling. After the reaction is complete the pH of the mixture is raised to between 6.5 and 7 by the addition of sodium carbonate and a solution of the sodium salt of 6.93 parts of metanilic acid in 100 parts of water is added. The mixture is then stirred for 4 hours at 30° to 40°C while the pH of the mixture is maintained between 4.5 and 6 by the addition of sodium carbonate. The resulting solution is cooled to 0°C., 20 parts of a 2N aqueous solution of sodium nitrate are added, followed by 12 parts of a concentrated aqueous solution of hudrochloric acid. The mixture is stirred for 30 minutes and the excess nitrous acid is then destroyed by addition of sulphamic acid. The resulting mixture containing the diazo compound is added with stirring to a slightly alkaline solution of 7.3 parts of 1-ethyl-3-cyano-4-methyl-6-hydroxypyrid-2-one in 200 parts of water at 0° to 4°C., and the pH is adjusted to between 7.5 and 8.0. After coupling is completed, acetic acid is added to lower the pH to 6.0 , the temperature is raised to 20°C., and the dyestuff precipitated by the addition of sodium chloride. The precipitate is then filtered off and redissolved in 500 parts of water at 20°C. with stirring. A solution of 7 parts of trimethylamine in 20 parts of water is then added and the mixture is stirred for 30 minutes. The pH of the mixture is then adjusted to 7.0 by the dropwise addition of hydrochloric acid (36°Tw) and the dyestuff is precipitated by addition of sodium chloride. The precipitate is filtered off and dried at 20°C.

When applied to cotton and viscose rayon textile materials in conjunction with a treatment with an acid binding agent the dyestuff yields bright greenish-yellow shades having excellent fastness to wet treatments such as washing and to light.

EXAMPLE 182

A solution of 13.4 parts of 1,4-phenylenediamine-2,5-disulphonic acid in 150 parts of water is condensed with 9.25 parts of cyanuric chloride in 100 parts of water and 30 parts of acetone at 0°14 5°C, then the product is diazotized and coupled with 8.9 parts of 1-ethyl-3-cyano-4-methyl-6-hydroxypyrid-2-one dissolved in 150 parts of water at 5°–10°C and pH 6.5 in similar manner to Example 1.

The solution is then warmed to 20°–25°C., a solution of 10.6 parts of the sodium salt of 2-mercaptobenzthiazole in 108 parts of water is added and the mixture is stirred at 30°C. for 4 hours. The dyestuff is then precipitated by addition of sodium chloride, filtered and dried.

When applied to cellulose it gives reddish-yellow shades which are fast to washing and to light.

EXAMPLE 183

In place of the 10.6 parts of 2-mercaptobenzthiazole used in Example 182 there are used 8.6 parts of sodium diethyldithiocarbamate when a dyestuff similar in shade is obtained and which has good fastness to washing and to light.

EXAMPLE 184

In place of the 10.6 parts of 2-mercaptobenzthiazole used in Example 182, there are used 17.2 parts of sodium diethyldithiocarbamate. The resultant dyestuff also gives reddish-yellow shades when applied to cellulose.

Further examples prepared similarly to Example 181 are disclosed in the Table, when the diamine in Column II is condensed with one equivalent of cyanuric chloride, the product of condensation is then condensed with one equivalent of the compound in Column III and this secondary condensation product is diazotized and coupled with the compound in Column IV. The monochlorotriazinyl azo dyestuff thus obtained is then converted to the quaternary ammonium salt by heating with the compound in Column V, and the shade of the dyestuff when applied to cellulose is given to Column VI.

Alternatively, the product of condensation of cyanuric chloride and the diamine in Column II may be diazotised and coupled to the compound in Column IV, and this dichlorotriazinyl azo dyestuff condensed with the compound in Column III prior to quaternization with the compound in Column V.

| Example | II | III | IV | V | VI |
| --- | --- | --- | --- | --- | --- |
| 185 | 1,3-phenylenediamine-4,6-disulphonic acid | metanilic acid | 3-aminocarbonyl-1-ethyl-4-methyl-6-hydroxypyrid-2-one | pyridine | Greenish yellow |
| 186 | do. | ammonia | do. | do. | do. |
| 187 | do. | do. | do. | trimethylamine | do. |
| 188 | do. | do. | do. | diazabicyclo octane | do. |
| 189 | do. | do. | do. | N,N-dimethyl hydrazine | do. |
| 190 | do. | do. | do. | N-methyl pyrollidine | do. |
| 191 | 1,4-phenylenediamine-2,5-disulphonic acid | aniline 3,5-disulphonic acid | 1-ethyl-4-methyl-6-hydroxypyrid-2-one | do. | Reddish-yellow |
| 192 | do. | do. | do. | pyridine | do. |
| 193 | do. | do. | do. | trimethylamine | do. |
| 194 | do. | do. | do. | diazabicyclo octane | do. |
| 195 | 1,3-phenylenediamine 6-sulphonic acid | aniline 2,5-disulphonic acid | do. | do. | Greenish-yellow |
| 196 | do. | do. | do. | pyridine | do. |
| 197 | do. | do. | do. | trimethylamine | do. |
| 198 | do. | do. | do. | N,N-dimethyl hydrazine | do. |
| 199 | do. | 3,5-disulphophenol | do. | pyridine | do. |
| 200 | do. | do. | do. | trimethylamine | do. |

SECTION E

This section describes the manufacture of a highly important class of monoazo dyestuffs of the invention, namely, where the reactive group takes the form of —NH—L¹—Q—L², as defined earlier in this specification, and more especially by formula (7).

Such dyes can be obtained by a number of methods. In certain cases it is possible to synthesize an aromatic amine containing the above group and diazotize and couple with the hydroxypyridone coupling component. More generally, however, it is preferred to form a monoazo dyestuff containing a free amino group and react this with a compound of the formula in terms of the above symbols:

halogen.L¹—Q—L² in which the grouping L¹.halogen has a substantially higher reactivity than the group L² or to form a monoazo dyestuff containing a -L¹-halogen grouping, and react successively with a diamine and then with a halogeno-heterocyclic compound which is represented by the formula L₂-halogen.

EXAMPLE 201

9.3 parts of cyanuric chloride are condensed with 13.4 parts of 1,3-phenylene diamine-4,6-disulphonic acid at 13.4 –4°C/pH 4–5 and the dichloro-s-triazine compound is diazotized and coupled with 9.8 parts of 1-ethyl-3-aminocarbonyl-4-methyl-6-hydroxypyrid-2-one in a similar manner to Example 1.

A solution of 9.4 parts of 1,3-phenylene diamine-4-sulphonic acid in 150 parts of water is neutralized with dilute caustic soda solution and added, and the mixture is stirred at 30°–40°C and kept at pH 5–7 until one chlorine atom of the dichloro-s-triazine group has been replaced.

The solution is cooled to 0-4°C and stirred vigorously and a solution of 9.3 parts of cyanuric chloride in 30 parts of acetone is added. The resultant mixture is stirred at 0°–4°C for 2 hours, keeping the pH at 5–7, then 650 parts of water are added, followed by 15 parts of a 1:2 mixture of disodium hydrogen phosphate and potassium dihydrogen phosphate and then 240 parts of sodium chloride. The precipitated dyestuff is filtered off, mixed with 6 parts of the mixture of phosphates and dried.

The product contains 3.0 hydrolyzable chlorine atoms for each azo group and colors cellulose textile materials in bright greenish-yellow shader of excellent fastness to washing and light.

Further examples, similar to Examples 201 are set out in the following table, being obtained by condensing the diamine of column II with one mole of cyanuric chloride, diazotizing and coupling with the pyridone compound of column III, reacting the resultant azo compound with the diamine of column IV and finally reacting with the heterocyclic compound of column V.

| Example | II | III | IV | V | Shade |
|---|---|---|---|---|---|
| 202 | 1,3-phenylenediamine-4,6-disulphonic acid | 1-ethyl-3-aminocarbonyl-4-methyl-6-hydroxy-pyrid-2-one | 1,4-phenylenediamine-2-sulphonic acid | cyanuric chloride | greenish yellow |
| 203 | do. | do. | 1,4-phenylenediamine-2,5-disulphonic acid | do. | do. |
| 204 | do. | do. | 1,3-phenylenediamine-4-sulphonic acid | 2,4,6-trichloro-pyrimidine | do. |
| 205 | do. | do. | do. | 2,4,5,6-tetra-chloropyrimidine | do. |
| 206 | do. | do. | 1,3-phenylenediamine-4,6-disulphonic acid | cyanuric chloride | do. |
| 207 | do. | 1-ethyl-3-cyano-4-methyl-6-hydroxy-pyrid-2-one | 1,3-phenylenediamine-4-sulphonic acid | do. | do. |
| 208 | do. | do. | 1,4-phenylenediamine-2-sulphonic acid | do. | do. |
| 209 | do. | do. | 1,4-phenylenediamine-2,5-disulphonic acid | do. | do. |
| 210 | do. | do. | 1,3-phenylenediamine-4,6-disulphonic acid | do. | do. |
| 211 | do. | 1-ethyl-3-(ethylamino-carbonyl)-4-methyl-6-hydroxypyrid-2-one | 1,3-phenylenediamine-4-sulphonic acid | do. | do. |
| 212 | do. | 1-ethyl-3-(phenylamino-carbonyl)-4-methyl-6-hydroxypyrid-2-one | 1,3-phenylenediamine-4,6-disulphonic acid | do. | do. |
| 213 | do. | 1-ethyl-3-(N-methyl-N-benzyl-aminocarbonyl)-4-phenyl-6-hydroxy-pyrid-2-one | do. | do. | do. |
| 214 | do. | 1-ethyl-4-methyl-6-hydroxypyrid-2-one | do. | do. | do. |
| 215 | do. | do. | 1,3-phenylenediamine-4-sulphonic acid | do. | do. |
| 216 | do. | do. | 1,4-phenylenediamine-2,5-disulphonic acid | do. | do. |
| 217 | do. | do. | 1,3-phenylenediamine-4-sulphonic acid | 2,4-dichloro-6-methoxy-s-triazine | do. |
| 218 | do. | 1-ethyl-3-aminocarbonyl-4-methyl-6-hydroxy-pyrid-2-one | 1,4-phenylenediamine-2,5-disulphonic acid | 2,4-dichloro-6-(4'-sulphophenoxy)-s-triazine | do. |
| 219 | 1,4-phenylenediamine-2,5-disulphonic acid | 1-(3'-methoxypropyl)-3-aminocarbonyl-4-methyl-6-hydroxypyrid-2-one | 1,3-phenylenediamine-4-sulphonic acid | cyanuric chloride | reddish yellow |
| 220 | do. | 1-ethyl-4-methyl-6-hydroxypyrid-2-one | do. | do. | do. |

EXAMPLE 221

The dichloro-s-triazinyl dyestuff obtained by the diazotization and coupling of the condensation product then reacted with an equimolar proportion of the product of the condensation of 1 mole of the heterocyclic compound of Column IV and 1 mole of the diamine of Column V.

| Example | II | III | IV | V | Shade |
|---|---|---|---|---|---|
| 222 | 1,3-phenylenediamine-4,6-disulphonic acid | 1-ethyl-3-cyano-4-methyl-6-hydroxypyrid-2-one | 2,4-dichloro-6-amino-s-triazine | 1,3-phenylenediamine-4-sulphonic acid | greenish yellow |
| 223 | do. | 1-(3'-methoxypropyl)-3-cyano-4-methyl-6-hydroxypyrid-2-one | do. | do. | do. |
| 224 | do. | 1-ethyl-3-aminocarbonyl-4-methyl-6-hydroxypyrid-2-one | do. | do. | do. |
| 225 | do. | do. | 2,4-dichloro-6-(2'-methyl-5'-sulphoanilino)-s-triazine | do. | do. |
| 226 | do. | do. | 2,4,6-trichloropyrimidine | do. | do. |
| 227 | do. | do. | 2,4,5,6-tetrachloropyrimidine | do. | do. |
| 228 | do. | do. | 2,4-dichloro-6-(3'-sulphoanilino)-s-triazine | 1,4-phenylenediamine-2-sulphonic acid | do. |
| 229 | do. | do. | 2,4-dichloro-6-amino-s-triazine | do. | do. |
| 230 | do. | do. | 2,4-dichloro-6-β-hydroxyethyl-amino-s-triazine | 1,4-phenylenediamine-2,5-disulphonic acid | do. |
| 231 | do. | do. | do. | 1,3-phenylenediamine-4,6-disulphonic acid | do. |
| 232 | 1,3-phenylenediamine-4-sulphonic acid | do. | do. | do. | do. |
| 233 | do. | do. | do. | 1,4-phenylenediamine-2,5-disulphonic acid | do. |
| 234 | 1,4-phenylenediamine-2-sulphonic acid | do. | do. | do. | yellow |
| 235 | 1,3-phenylenediamine-4,6-disulphonic acid | 1-ethyl-3-phenylamino-carbonyl-4-methyl-6-hydroxypyrid-2-one | 2,4-dichloro-6-amino-s-triazine | 1,3-phenylenediamine-4,6-disulphonic acid | greenish yellow |
| 236 | do. | 1-ethyl-4-methyl-6-hydroxypyrid-2-one | cyanuric chloride | ethylene diamine | do. |
| 237 | do. | do. | 2,4-dichloro-6-(2'-methyl-5'-sulphoanilino)-s-triazine | hydrazine | do. |
| 238 | do. | do. | do. | N-methylhydrazine | do. |
| 239 | do. | do. | 2,4-dichloro-6-methoxy-s-triazine | 1,4-phenylenediamine-2,5-disulphonic acid | do. |
| 240 | do. | do. | 2,4-dichloro-6-amino-s-triazine | 1,3-phenylenediamine-4-sulphonic acid | do. | between 8.5 parts of cyanuric chloride and 26.8 parts of 1,3-phenylene diamine-4,6-disulphonic acid with 17.8 parts of 1-ethyl-3-cyano-4-methyl-6-hydroxypyrid-2-one is reacted at 30–40°C/pH 5–7 with the condensation product obtained by reacting 18.5 parts of cyanuric chloride with 18.8 parts of 1,3-phenylenediamine-4-sulphonic acid and 17.3 parts of metanilic acid, until one chlorine atom of the dichloro-s-triazinyl dye has completely reacted. The bis-(monochloro-s-triazinyl)dye is isolated by the addition of sodium chloride. It dyes cotton and viscose rayon in bright greenish-yellow shades having excellent fastness to washing and to light.

Further Examples, similar to that described in Example 221 can be obtained when the product of equimolar proportions of cyanuric chloride and the diamine of Column II is diazotized and coupled with the coupling component of Column III. The monoazo compound is

EXAMPLE 241

The process of Example 201 is repeated up to the end of the second condensation with cyanuric chloride. Then, instead of isolating the dyestuff, 18 parts of ammonia liquor (s.g. 0.88) are added, and the mixture is heated to 30°C and stirred at 30°–40°C for 30 minutes. The pH is then adjusted to 6.5 with hydrochloric acid (36°Tw) and the dyestuff is precipitated by the addition of 15% w/v sodium chloride. The precipitate is filtered off, washed with a 10% solution of sodium chloride and dried in vacuo at 40°C. Upon analysis it is found to contain 1.95 moles of chlorine per mole of dyestuff. It yields bright greenish-yellow shades when applied to cellulose having good fastness to washing and light.

Further examples, similar in shade to that obtained in Example 201 are obtained by condensing one mole of the diamine of column II with one mole of cyanuric chloride, diazotizing the product and coupling with one mole of the coupling component named in column III, the product being then reacted successively with one mole of the diamine of column IV one mole of cyanuric chloride and one mole of the compound in column V.

maintained at 6–7 by the gradual addition of 2N sodium carbonate solution.

To the resultant solution is added a screened solution of the dyestuff prepared by the addition of a solution of 31.7 parts of the trisodium salt of 1-amino-4(4'-aminoanilino)anthraquinone-2,3', 5-trisulphonic acid

| Example | II | III | IV | V |
|---|---|---|---|---|
| 242 | 1,3-phenylenediamine-4,6-disulphonic acid | 1-ethyl-3-aminocarbonyl-4-methyl-6-hydroxypyrid-2-one | 1,4-phenylenediamine-2-sulphonic acid | ammonia |
| 243 | do. | do. | 1,4-phenylenediamine-2,5-disulphonic acid | do. |
| 244 | do. | do. | 1,3-phenylenediamine-4,6-disulphonic acid | ethylamine |
| 245 | do. | do. | 1,3-phenylenediamine-4-sulphonic acid | metanilic acid |
| 246 | do. | do. | do. | ethanolamine |
| 247 | do. | do. | do. | sulphanilic acid |
| 248 | do. | do. | do. | 4-sulpho-2-aminotoluene |
| 249 | do. | do. | do. | 5-sulpho-2-aminotoluene |
| 250 | do. | do. | do. | N-methylaniline |
| 251 | do. | do. | do. | 3,5-disulphoaniline |
| 252 | do. | do. | do. | 4,8-disulpho-1-naphthylamine |
| 253 | do. | do. | do. | 3,8-disulpho-1-naphthylamine |
| 254 | do. | do. | do. | 4,8-disulpho-2-naphthylamine |
| 255 | do. | do. | do. | 5,7-disulpho-2-naphthylamine |
| 256 | do. | do. | do. | 4-sulpho-1-naphthylamine |
| 257 | do. | do. | do. | 5-sulpho-1-naphthylamine |
| 258 | do. | do. | do. | 6-sulpho-1-naphthylamine |
| 259 | do. | do. | do. | 7-sulpho-1-naphthylamine |
| 260 | do. | do. | do. | 8-sulpho-1-naphthylamine |
| 261 | do. | do. | do. | 5-sulpho-2-naphthylamine |
| 262 | do. | do. | do. | 6-sulpho-2-naphthylamine |
| 263 | do. | do. | do. | 7-sulpho-2-naphthylamine |
| 264 | do. | do. | do. | 3,6,8-trisulpho-1-naphthylamine |
| 265 | do. | do. | do. | 4,6,8-trisulpho-1-naphthylamine |
| 266 | do. | do. | do. | 3-sulpho-N-methylaniline |
| 267 | do. | do. | do. | 4-sulphophenol |
| 268 | do. | do. | do. | 3,5-disulphophenol |
| 269 | do. | do. | do. | 5-sulpho-2-aminobenzoic acid |
| 270 | do. | do. | do. | 4-sulpho-2-aminobenzoic acid |
| 271 | do. | do. | do. | aniline |
| 272 | do. | 1-ethyl-3-cyano-4-methyl-6-hydroxypyrid-2-one | do. | ammonia |
| 273 | do. | do. | 1,4-phenylenediamine-2-sulphonic acid | ethanolamine |
| 274 | do. | do. | 1,4-phenylenediamine-2,5-disulphonic acid | ammonia |
| 275 | do. | do. | 1,3-phenylenediamine-4,6-disulphonic acid | ammonia |
| 276 | do. | 1-ethyl-3(diethylaminocarbonyl)-4-methyl-6-hydroxypyrid-2-one | 1,3-phenylenediamine-4-sulphonic acid | do. |
| 277 | 1,3-phenylenediamine-4-sulphonic acid | 1-ethyl-3-aminocarbonyl-4-methyl-6-hydroxypyrid-2-one | 1,4-phenylenediamine-2,5-disulphonic acid | do. |
| 278 | do. | 1-(3'-methoxypropyl)-3-aminocarbonyl-6-hydroxypyrid-2-one | 1,3-phenylenediamine-4-sulphonic acid | ethanolamine |

EXAMPLE 279

A solution of 13.4 parts of 1,3-phenylenediamine-4,6-disulphonic acid in 100 parts of water at 0°–5°C, pH 5.0 is condensed with 9.25 parts of cyanuric chloride in 30 parts of acetone and 120 parts of ice water, and the product is diazatized and coupled with 8.9 parts of 1-ethyl-3-cyano-4-methyl-6-judrpxu-2-pyridone in similar manner to Example 1.

The resultant greenish yellow solution is stirred and a neutral solution of 9.4 parts of p-phenylenediamine-o-sulphonic acid in 100 parts of water added. The mixture is stirred at 35°–40°C for 2 hours whilst the pH is maintained at 6–7 by the gradual addition of 2N sodium carbonate solution.

in 250 parts of water to a stirred suspension of 9.25 parts of cyanuric chloride in 50 parts of acetone and 100 parts of water at 0°–5°C the mixture is stirred for 30 minutes whilst the pH is maintained at 4–5 by the gradual addition of 2N sodium carbonate. The reaction mixture is stirred and heated at 55°–60°C for 5 hours whilst the pH is maintained at 6–7 by the gradual addition of 2N sodium carbonate. 250 parts of sodium chloride are added and the mixture is stirred and allowed to cool to room temperature.

The precipitated dyestuff is filtered, washed on the filter with a solution of 60 parts of sodium chloride in 200 parts of water and is finally dried in vacuo at 25°C.

The product is found on analysis to contain 2 atoms of hydrolyzable chlorine per molecule of dyestuff and when applied to cellulosic fibers in conjunction with an acid-binding agent yields strong green shades fast to light and wet treatments.

By substitution of equimolar amounts of the compounds listed in Column II for the 1,3-phenylenediamine-4,6-disulphonic acid used in the above example, equimolar amounts of the compounds listed in Column V for the p-phenylenediamine-o-sulphonic acid and equimolar amounts of the compounds listed in Column VI for the dichloro-s-triazinyl derivative of 1-amino-4(4'-aminoanilino) anthraquinone-2,3,5-trisulphonic acid used in the above example, a series of green-olive dyestuffs of similar properties are obtained.

60°C. and the pH of the mixture is left at 6 by the addition of 2N sodium carbonate solution until the reaction is complete. The product is precipitated by the addition of salt, filtered off and dried. It dyes cotton a bright green shade.

SECTION F BISAZO DYES

A large number of bisazo dyes of the invention can be obtained by coupling a N-substituted 6-hydroxypyrid-2-one with a diazotized aminoazo compound containing a cellulose-reactive group. The latter compounds can conveniently be obtained by diazotizing an aromatic amine containing a cellulose-reactive group (for examples of which see Section A above) and coupling the resultant diazonium compound with a coupling

| Example | II | III | IV | V | VI 2,4-dichlorotriazinyl derivative of | VII |
|---|---|---|---|---|---|---|
| 280 | 1,4-phenylenediamine-2,5-disulphonic acid | cyanuric chloride | 1-ethyl-3-cyano-4-methyl-6-hydroxy-2-pyridone | p-phenylenediamine-o-sulphonic acid | 1-amino-4(3'-aminoanilino)-anthraquinone-2,4'-disulphonic acid | Olive |
| 281 | do. | do. | do. | m-phenylenediamine-4-sulphonic acid | 1-amino-4(4'-methyl-aminoanilino)-anthraquinone-2,3'-disulphonic acid | Olive |
| 282 | 1,3-phenylenediamine-4,6-disulphonic acid | do. | do. | do. | 1-amino-4(2',4',6'-trimethyl-3'-amino-anilino)anthraquinone-2,3'-disulphonic acid | Olive |
| 283 | do. | do. | do. | p-phenylenediamine-o-sulphonic acid | 1-amino-4(4'-amino-anilino)anthraquinone-2,3'-disulphonic acid | Green |
| 284 | 1,4-phenylenediamine-2,5-disulphonic acid | do. | do. | 4-amino-N-methyl-aniline-2-sulphonic acid | 1-amino-4(4''-amino-diphenylamino)anthraquinone-2,2'' 3'-trisulphonic acid | Olive |

EXAMPLE 285

A solution of 13.4 parts of 1:3-phenylenediamine-4:6disulphonic acid in 100 parts of water at 0°–5°and pH 5.0 is condensed with 9.25 parts of cyanuric chloride in 30 parts of acetone, 60 parts of water and 60 parts of ice, and the product is diazotized and coupled with 8.9 parts of 1-ethyl-3-cyano-4-methyl-6-hydroxy-2-pyridone in similar manner to Example 1.

28.8 Parts of copper phthalocyanine is converted to sulphonchloride by heating with 250 parts of chlorsulphonic acid at 135°–140°for 4 hours. The reaction mixture is drained on ice, and the precipitated sulphonchloride filtered off, washed with ice-water and drained well. The sulphonchloride is suspended in water, a solution of 14.7 parts of the sodium salt of 1:4-phenylenediamine-3-sulphonic acid added, followed by 33.6 parts of sodium bicarbonate, The mixture is stirred at room temperature for 18 hours, when the product is precipitated by the addition of concentrated hydrochloric acid, filtered off, washed with dilute hydrochloric acid solution and dried. It is then dissolved in 500 parts of water by adding 2N sodium hydroxide solution until the pH is 7. The solution is cooled to 5°C and a solution of 9.25 parts of cyanuric chloride in 60 parts of acetone is added. The pH of the mixture is left at 6 by adding 50 parts of N sodium hydroxide solution as required. A solution of 10.5 parts of the sodium salt of 1:4-phenylenediamine-3-sulphonic acid is added, the temperature is raised to 35°–40°C and the pH is left at 6 by the addition of 50 parts of N sodium hydroxide as required. The dichlorotriazinyl derivative of paragraph two above is added, and the temperature is raised to 60°C. and the pH of the mixture is left at 6 by the addition of 2N sodium carbonate solution until the reaction is complete. The product is precipitated by the addition of salt, filtered off and dried. It dyes cotton a bright green shade.

component which itself contains a diazotizable amino group. Included in the latter are a number of aminonaphthol sulphonic acids, but the preferred coupling components for use in this connection are p-coupling amines of the benzene and naphthalene series, e.g.:

o- and m- toluidines
o- and m- anisidines
cresidine
m-aminoacetanilide and other mono acylated phenylene diamines
m-aminophenyl urea
1-naphthylamine
6- and 7-sulpho-1-naphthylamines The dyes obtained in this manner conform to the general formula:

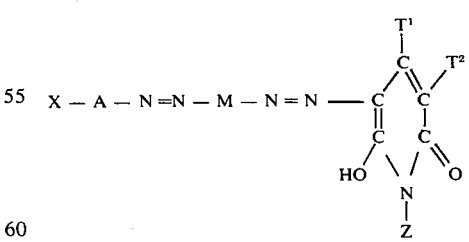

wherein X, Z, $T^1$ and $T^2$ have the meanings stated
X — A — is the residue of the diazotizable amine containing a cellulose-reactive group and — M — is the residue of the coupling component containing a diazotizable group. Preferably, A will represent a mono- or di-sulpho-m- or p-phenylene radical or a disluphonaphthylene radical and M will represent a 1,4-phenylene radical which may be substituted, e.g. by methyl, methoxy, acylamino and/or ureido or a 1,4-naphthylene radical which may be substituted in the 6- or 7- position by SO₃H.

The following examples and Table depict a number of new bisazo dyestuffs of the invention obtained in this manner

EXAMPLE 28

The diazo component obtained by reacting 18.5 parts of cyanuric chloride with 26.8 parts of 1,4-phenylenediamine-3,6-disulphonic acid at 0°–5°C/pH 3.5 – 5.0 and 17.3 17.3 parts of metanilic acid is diazotized and coupled with 13.7 parts of 2-methoxy-5-methylaniline in the presence of sodium acetate. The amino azo compound so obtained is diazotized and coupled with 17.8 parts of 1-methyl-3-cyano-4-methyl-6-hydroxy-pyrid-2-one to give a bis-azo dyestuff dyeing cotton and viscose rayon in bluish-red shades having excellent fastness to washing and to light.

The following table describes further examples obtained in similar manner to Example 286. One mol of the diamine in Column II is condensed with one mol of the acylating agent in Column III, and, where described, the product is then condensed with a further equivalent of the compound described in Column IV. The product is then diazotized and coupled with the coupling component described in Column V. the aminoazo compound so formed is diazotized and coupled with the pyridone coupling component described in Column VI to form a bis-azo dyestuff. The shades obtained when applied to cellulose are described in Column VII.

| Ex. | II | III | IV | V | VI | VIII |
|---|---|---|---|---|---|---|
| 287 | 1,4-phenylenediamine-2,5-disulphonic acid | cyanuric chloride | — | 1-aminonaphthalene-6-sulphonic acid | 1-ethyl-3-cyano-4-methyl-6-hydroxypyrid-2-one | Bluish-red |
| 288 | do. | do. | — | 1-aminonaphthalene-7-sulphonic acid | do. | do. |
| 289 | do. | do. | — | do. | 1-ethyl-3-aminocarbonyl-4-methyl-6-hydroxypyrid-2-one | do. |
| 290 | do. | do. | — | do. | 1-ethyl-4-methyl-6-hydroxypyrid-2-one | do. |
| 291 | do. | do. | — | 1-aminonaphthalene-6-sulphonic acid | do. | do. |
| 292 | do. | do. | — | do. | 1-ethyl-3-aminocarbonyl-4-methyl-6-hydroxypyrid-2-one | do. |
| 293 | do. | do. | metanilic acid | do. | do. | do. |
| 294 | 1,3-phenylenediamine 4,6-disulphonic acid | do. | do. | do. | 1-ethyl-3-cyano-4-methyl-6-hydroxypyrid-2-one | do. |
| 295 | do. | do. | do. | do. | do. | do. |
| 296 | do. | tetrachloro pyrimidine | — | do. | do. | do. |
| 297 | do. | 2-methylsulphenyl-6-methyl-4,5-dichloropyrimidine | — | do. | do. | do. |
| 298 | do. | cyanuric chloride | 4-β-sulphato-ethyl sulphonylaniline | do. | do. | do. |
| 299 | do. | 2,4-dichloro-6-methoxy-s-triazine | — | do. | do. | do. |
| 300 | do. | cyanuric chloride | ammonia | do. | do. | do. |
| 301 | do. | do. | metanilic acid | do. | do. | do. |
| 302 | do. | do. | — | 1-aminonaphthalene-7-sulphonic acid | do. | do. |
| 303 | do. | do. | 4-sulphophenol | 1-aminonaphthalene-6-sulphonic acid | do. | do. |
| 304 | do. | do. | — | do. | 1-ethyl-3-aminocarbonyl-4-methyl-6-hydroxypyrid-2-one | do. |
| 305 | do. | do. | — | do. | 1-ethyl-4-methyl-6-hydroxypyrid-2-one | do. |
| 306 | 1,3-phenylenediamine 6-sulphonic acid | do. | metanilic acid | do. | 1-ethyl-3-cyano-4-methyl-6-hydroxypyrid-2-one | do. |
| 307 | do. | do. | do. | do. | 1-γ-methoxypropyl-3-cyano-4-methyl-6-hydroxypyrid-2-one | do. |
| 308 | 1,4-phenylenediamine-6-sulphonic acid | do. | 1-naphthylamine-3,6,8-trisulphonic acid | do. | do. | do. |
| 309 | do. | do. | 4-sulphophenol | do. | do. | do. |
| 310 | 1,3-phenylenediamine 4,6-disulphonic acid | do. | — | cresidine | 1-ethyl-3-cyano-4-methyl-6-hydroxypyrid-2-one | do. |
| 311 | do. | do. | — | 2,5-dimethoxyaniline | do. | do. |

| Ex. | II | III | IV | V | VI | VIII |
|---|---|---|---|---|---|---|
| 312 | do. | do. | sulphanilic acid | do. | do. | do. |
| 313 | do. | do. | ammonia | do. | do. | do. |
| 314 | 1,3-phenylenediamine 6-sulphonic acid | 2,4-dichloro-6-[2'-sulpho-4'-'2-chloro-4-amino-6-s-triazinylamino) phenylamino]-s-triazine | — | 1-aminonaphthalene 2-sulphonic acid | 1-ethyl-4-methyl-6-hydroxypyrid 2-one | do. |
| 315 | do. | 2,4-dichloro-6-[2'-sulpho-5'-(2-chloro-4-anilino-6-s-triazinylamino) phenylamino]-s-triazine | — | do. | 3-carbonylamino-1-ethyl-4-methyl-6-hydroxypyrid-2-one | do. |
| 316 | 1,3-phenylenediamine 4,6-disulphonic acid | cyanuric chloride | 2-naphthyl-amino-6-sulphonic acid | cresidine | do. | do. |
| 317 | do. | do. | 4-β-sulphato-ethyl aniline | do. | do. | do. |
| 318 | do. | do. | 4-methyl-aniline | m-toluidine | do. | do. |
| 319 | do. | do. | — | 1-aminonaphthalene 2-sulphonic acid | 1,3-diethyl-4-methyl-6-hydroxy pyrid-2-one | do. |
| 320 | do. | do. | metanilic acid | do. | do. | do. |

A different class of bisazo dyes of the invention are obtained by condensing 2 moles of a monoazo dye of the invention containing a dichloro-s-triazine group with 1 mole of a diamino compound. The resultant class of compounds are represented by the general formula:

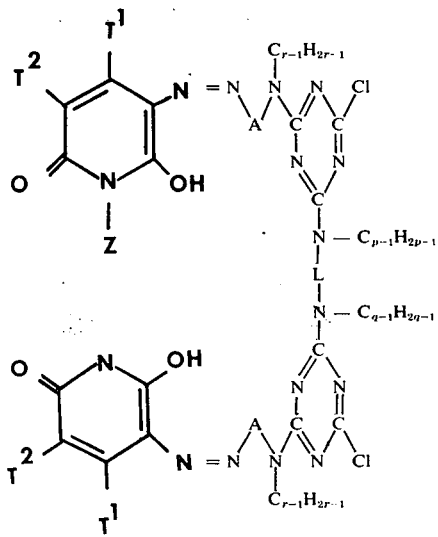

wherein the symbols $T^1$, $T^2$, Z, A, L, p, q and r have the meanings stated earlier.

As diamino compounds which may be used, there may be mentioned:
hydrazine and piperazine,
aliphatic amines, e.g.:
ethylene diamine
1,2- and 1,3-propylenediamines
1,6-hexamethylenediamine
2,2'-diaminodiethylether
mono- and di-cyclic diamines of the benzene series, e.g.:
1,3-diaminobenzene-4-sulphonic and 4,6-disulphonic acids,
1,4-diaminobenzene-2-sulphonic and 2,5-disulphonic acids,
1,3- and 1,4-phenylenediamines,
benzidine and benzidine-2,2'-disulphonic acid,
4,4'-diaminodiphenylurea and its 2,2'- and 3,3'-disulphonic acids,
3,3'-diaminodiphenylurea,
4,4'-diaminodiphenylmethane,
4,4'-diaminodiphenyl sulphone,
4,4'-diaminodiphenyl ether,
4,4'-diaminostilbene-2,2'-disulphonic acid,
4,4'-diaminodiphenoxyethane-2,2'-disulphonic acid,
and naphthylene diamines, e.g.:
2,6-diaminonaphthalene-1,5-disulphonic acid,
1,5-diaminonaphthalene-3,7-disulphonic acid.

Dyestuffs of the above class in which r has the value 1 can alternatively be obtained by condensing 2 moles of cyanuric chloride with 1 mole of the diamine of formula

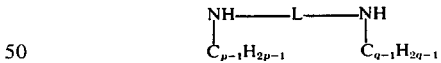

and with 2 moles of a diamine of formula $NH_2.A.NH_2$ then tetrazotizing the resultant product and coupling with 2 moles of a N-substituted 6-hydroxypyrid-2-one.

The following examples and table depict a number of new azo dyestuffs of the invention obtained by these methods. In the table, column II names the N-substituted 6-hydroxypyrid-2-one used, column III names the diamine of formula $NH_2.A.NHC_{r-1}H_{2r-1}$ and column IV the diamine of formula

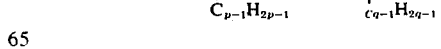

EXAMPLE 321

A solution of 6.7 parts of 1,3-phenylenediamine-4,6-disulphonic acid is 50 parts of water at 0°–5°C and pH 5.0 is added rapidly with stirring to a suspension prepared by dissolving 4.63 parts of cyanuric chloride in 25 parts of acetone and adding the resulting solution to 50 parts of water and 50 parts of ice. The mixture is stirred for 2 hours at 0°–5°C maintaining the pH at 4–5 by addition of 2N sodium carbonate solution.

A solution of 5 parts of 4,4'-diaminodiphenylurea-2,2'-disulphonic acid in 50 parts of water at pH 6.5 is added rapidly to the solution prepared in the preceding paragraph and the mixture is stirred and heated at 30°–35°C for 1 hour, the pH being maintained at 6–7 by adding 2N sodium carbonate solution.

ethyl-3-cyano-4-methyl-6-hydroxypyrid-2-one in a similar manner to Example 1. 13.4 parts of 1,4-phenylenediamine-2,5-disulphonic acid are added and the mixture is heated at 30°–40°C/pH 5–7 until one chlorine atom from each of two moles of the dichloro-s-triazinyl dyestuff has completely reacted to give a bis-(monochloro-s-triazinyl)dye which is then isolated by the addition of sodium chloride.

The dyestuff dyed cotton and viscose rayon in bright greenish-yellow shades having excellent fastness to wet treatments such as washing and to light.

| Example | II | III | IV | Shade |
|---|---|---|---|---|
| 323 | 1-ethyl-3-cyano-4-methyl-6-hydroxypyrid-2-one | 1,3-diaminobenzene-4,6-disulphonic acid | 4,4'-diaminodiphenylurea-2,2'-disulphonic acid | greenish yellow |
| 324 | do. | do. | 4,4'-diaminostilbene-2,2'-disulphonic acid | do. |
| 325 | do. | do. | 4,4'-diaminodiphenoxyethane-2,2'-disulphonic acid | do. |
| 326 | do. | do. | benzidine-2,2'-disulphonic acid | do. |
| 327 | 1-ethyl-3-aminocarbonyl-4-methyl-6-hydroxypyrid-2-one | do. | do. | do. |
| 328 | do. | 1,3-diaminobenzene-4-sulphonic acid | 4,4'-diaminostilbene-2,2'-disulphonic acid | do. |
| 329 | 1-ethyl-4-methyl-6-hydroxypyrid-2-one | do. | 4,4'-diaminodiphenoxyethane-2,2'-disulphonic acid | do. |
| 330 | do. | do. | ethylenediamine | do. |
| 331 | 1,4-dimethyl-3-cyano-6-hydroxypyrid-2-one | 1,4-diaminobenzene-2,5-disulphonic acid | 1,4-phenylenediamine-2-sulphonic acid | reddish yellow |
| 332 | do. | do. | m-phenylenediamine | do. |
| 333 | do. | do. | benzidine | do. |
| 334 | 1-n-propyl-4-methyl-3-aminocarbonyl-6-hydroxypyrid-2-one | 1,3-diaminobenzene-4,6-disulphonic acid | 4,4'-diaminodiphenyl methane | greenish yellow |
| 335 | do. | do. | 4,4'-diaminodiphenyl urea | do. |
| 336 | do. | do. | 3,3'-diaminodiphenyl urea | do. |
| 337 | do. | do. | 1,3-propylene diamine | do. |
| 338 | 1,4-dimethyl-6-hydroxypyrid-2-one | 1,4-diaminobenzene-2-sulphonic acid | 2,6-diaminonaphthalene-4,8-disulphonic acid | reddish yellow |
| 339 | do. | do. | 1,5-diaminonaphthalene-3,7-disulphonic acid | do. |
| 340 | 1,4-dimethyl-3-aminocarbonyl-6-hydroxy-pyrid-2-one | 1,4-diaminobenzene-2,5-disulphonic acid | 4,4'-diaminodiphenyl sulphone | do. |
| 341 | do. | do. | hydrazine | do. |
| 342 | do. | do. | 4,4'-diaminodiphenyl ether | do. |
| 343 | do. | do. | piperazine | do. |
| 344 | do. | 1,3-diaminobenzene-4-sulphonic acid | 1,3-phenylenediamine-4-sulphonic acid | greenish yellow |
| 345 | do. | do. | 1,4-phenylenediamine-2-sulphonic acid | do. |

The solution is then cooled to 0°–5°C and 15 parts of 36°Tw hydrochloric acid added. The mixture is then tetrazotized by addition of 3.46 parts of sodium nitrite in 25 parts of water. The tetrazo suspension is then added to a suspension of 9.8 parts of 1-ethyl-3-aminocarbonyl-4-methyl-6-hydroxypyrid-2-one in 75 parts of water at 0°–5°C and pH 7.0. The mixture is stirred at 0°–5°C for 4 hours, the pH being maintained at 6-7 by addition of 2N sodium carbonate solution, and is finally stirred at 20°C for 16 hours. The dyestuff is precipitated by addition of potassium chloride, collected by filtration and washed with 50 parts of a saturated solution of potassium chloride. After drying in vacuo at 40°C, the dyestuff is found to contain 1.7 mols of hydrolyzable chlorine per mol of dye.

When applied to cellulose the dyestuff gives bright yellow shades of good fastness to washing and light.

EXAMPLE 322

18.5 Parts of cyanuric chloride are condensed with 26.8 parts of 1,3-phenylenediamine-4,6-disulphonic acid at 0°–4°C/pH 4.5 and the dichloro-s-triazinyl intermediate diazotized and coupled with 17.8 parts of 1-

EXAMPLE 346

In place of the 10.6 parts of 2-mercaptobenzthiazole used in Example 182 there is added 10.05 parts of 4,4'-diaminodiphenylurea-2,2'-disulphonic acid dissolved in 100 parts of water at pH 6.5. The solution is then stirred at 35°–40°C for 5 hours maintaining the pH at 6–7 with 2N sodium carbonate solution as required.

To the solution there are then added 5 parts of pyridine and 7.5 parts of sodium sulphite and the mixture is stirred at 60°C until sulphiting is complete, as judged by estimation of liberated sodium chloride. The dyestuff is precipitated by addition of potassium chloride and dried. When applied to cellulose it gives reddish yellow shades which have good fastness to washing and to light.

EXAMPLE 347

In place of the 10.05 parts of 4,4'-diaminodiphenylurea-2,2'-disulphonic acid used in Example 346 there are used 10.1 parts of 4,4'-diaminodiphenoxyethane-2,2'-disulphonic acid when a dyestuff similar in shade with good fastness to washing and to light is obtained.

1. An azo dyestuff having the formula

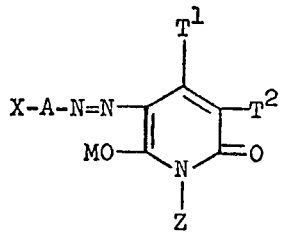

wherein X is a cellulose-reactive group selected from the class consisting of 5-chloro-6-methyl-2-methylsulphonyl-pyrimid-4-ylamino, 2,3-dichloroquinoxalin-6-ylcarbonylamino, β-(4,5-dichloropyridaz-6-on-1-yl)propionylamino, β-acetoxypropionylamino, acryloylamino, β-phenylsulphonylpropionylamino, 3,6-dichloropyridazin-4-ylcarbonylamino, 2,4-dichloropyrimid-6-ylamino, 2,6-dichloropyrimid-4-ylamino, 2,4-dichloropyrimid-5-ylcarbonylamino, 2,4,5-trichloropyrimid-6-ylamino, 2,5,6-trichloropyrimid-4-ylamino, 2,4-dichloro-5-bromopyrimid-6-ylamino, 2,6-dichloro-5-bromopyrimid-4-ylamino, 2,4-dichloro-5-cyanopyrimid-6-ylamino, 2,6-dichloro-5-cyanopyrimid-4-ylamino, 2,4-dichloropyrimid-5-ylsulphonylamino, 2-chlorobenzthiazol-6-ylcarbonylamino, 1,4-dichlorophthalazin-6-ylcarbonylamino, β-bromopropionylamino, 4-(4',5'-dichloropyridaz-6on-1-yl)benzoylamino, 2,3-dibromopropionyl, tetrafluorocyclobutylcarbonylamino, trifluorocyclobutenylcarbonylamino, tetrafluorocyclobutylacryloylamino, trifluorocyclobutenylacryloylamino, 2,4-dichloroquinazolin-5-ylcarbonylamino, and s-triazinyl amino groups of the formula:

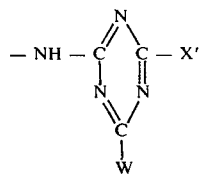

wherein X' is selected from the class consisting of Cl, Br, SO₃H, benzthiazol-2-ylthio, N,N-diethyldithiocarbamyl, pyridinium-1-yl, trimethylammonium, diazabicyclooctaniumyl, N',N'-dimethylhydraziniumyl, and N-methylpyrrolidinium-1-yl, and W is selected from the class consisting of Cl, Br, N,N-diethyldithiocarbamyl, lower alkoxy, lower alkoxy alkoxy, sulphophenoxy, NH₂, lower alkylamino, hydroxy-lower alkylamino, sulpho-lower alkylamino, lower alkoxy lower alkylamino, di(lower alkyl) amino, di(hydroxy lower alkyl) amino, morpholino, cyclohexylamino, benzylamino, hydrazinyl, anilino, N-methylanilino, N-(sulphomethyl) anilino, sulphoanilino, disulphoanilino, sulphotoluidino, carboxyanilino, sulphocarboxyanilino, anisidino, methoxytoluidino, sulphoanisidino, sulphochloroanilino, N-methylsulphoanilino, sulphonaphthylamino, disulphonaphthylamino, trisulphonaphthylamino and diamine of the formula:

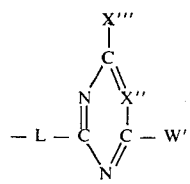

wherein L is selected from the class consisting of piperazinylene and

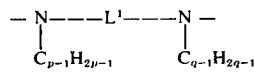

wherein p and q each independently represents 1 or 2 and L¹ is a direct link or a member selected from the class consisting of lower alkylene, phenylene, sulphophenylene, disulphophenylene, diphenylene, disulphodiphenylene, disulphonaphthylene and

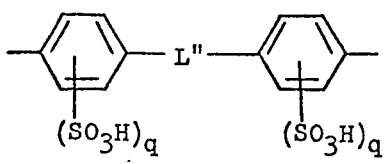

wherein L'' is NHCONH, CH=CH, OCH₂CH₂O, CH₂, SO₂ or O and q is 0 or 1, X'' is N, C-H, or C-Cl, X''' is Cl, or SO₃H, and W¹ is selected from the class consisting of lower alkoxy, sulphophenoxy, NH₂ lower alkylamino, Cl, lower (hydroxyalkyl) amino, anilino, N-methylanilino, sulphoanilino, disulphoanilino, N-methylsulphoanilino, sulphotoluidino, sulphocarboxyanilino, sulphonaphthylamino, disulphonaphthylamino, trisulphonaphthylamino, and

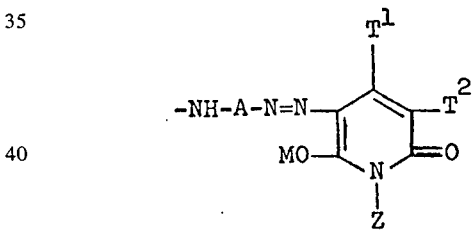

in which case both moieties of the formula:

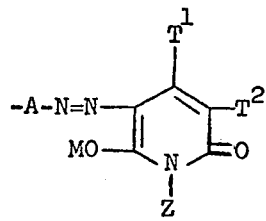

are identical, Z is selected from lower alkyl, hydroxy lower alkyl, lower alkoxy lower alkyl, lower alkylamino lower alkyl, cyclohexyl, phenyl and anisyl, T¹ is selected from H, lower alkyl, phenyl, anisyl and amino, T² is selected from H, cyano, lower alkyl, aminocarbonyl, N-lower alkylaminocarbonyl, N-phenylaminocarbonyl, N,N-di(lower alkylamino carbonyl) and N-lower alkyl-N-phenylaminocarbonyl, M is selected from H, Co and Cr, and when M is H, A is selected from monosulphophenylene, disulphophenylene, sulphonaphthylene and ( —A—N=N—M¹— )

wherein A is monosulphophenylene or disulphophenylene and M¹ is monosulpho-1,4-naphthylene or 1,4-phenylene in which the benzene nucleus carries 0-2 substituents selected from $CH_3$ and $CH_3O$, and when M is Co or Cr, A is sulpho-hydroxyphenylene linked through the oxygen to M.

2. The azo dyestuff of claim 1 wherein T¹ represents $CH_3$, Z represents $C_2H_5$ and T² represents —(CONH-$)_{n-1}$H where n is 1 or 2.

3. The azo dyestuff of claim 1 having the formula:

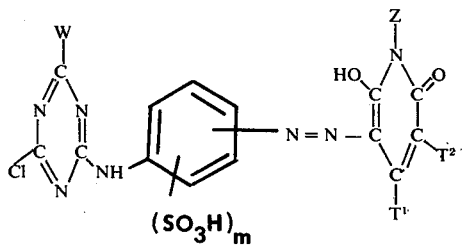

wherein T¹ is lower alkyl, Z is lower alkyl, T² is —(CONH)$_{n-1}$H wherein n is 1 or 2, m is 1 or 2 and W is Cl, $NH_2$, anilino having 1 or 2 $SO_3H$ groups or mono-, di- or tri-sulphonaphthylamino.

4. The azo dyestuff of claim 1 having the formula:

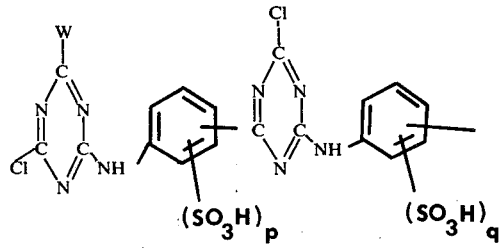

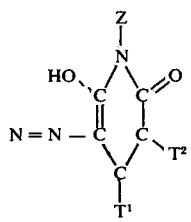

wherein T¹ is lower alkyl, Z is lower alkyl, T² is —9-CONH)$_{n-1}$H wherein n is 1 or 2, p and q are each independently 1 or 2, and W is Cl, $NH_2$ or anilino having 1 or 2 $SO_3H$ groups or mono-, di- or tri-sulphonaphthylamino.

5. The azo dyestuff of claim 1 having the formula:

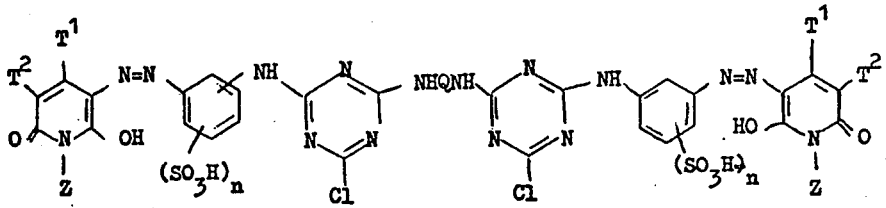

wherein T¹ is lower alkyl, T² is selected from the group consisting of hydrogen, CN and $CONH_2$, Z is lower alkyl, n is 1 or 2, and Q is selected from the group consisting of disulphonated diphenylurea, disulphonated stilbene, disulphonated diphenoxyethane and disulphonated diphenyl.

6. The azo dyestuff of claim 1 having the formula:

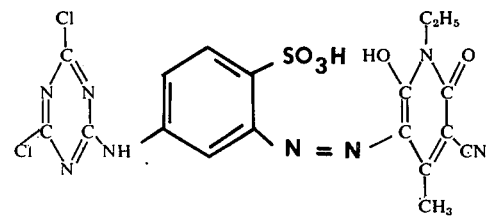

7. The azo dyestuff of claim 1 having the formula:

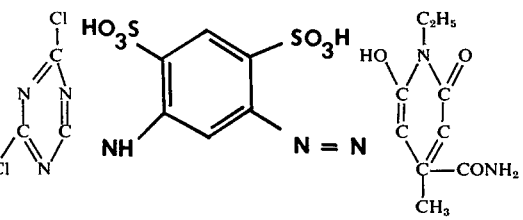

8. The azo dyestuff of claim 1 having the formula:

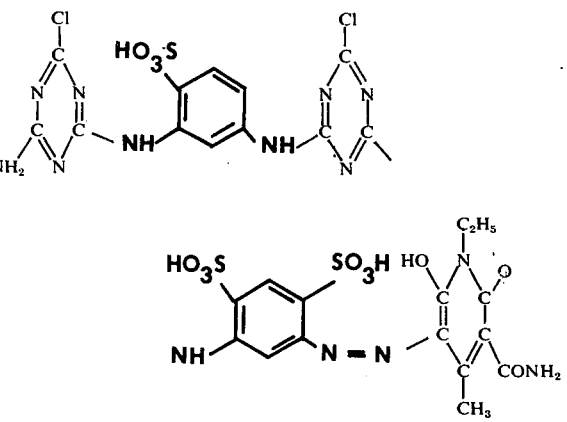

9. The azo dyestuff of claim 1 having the formula:

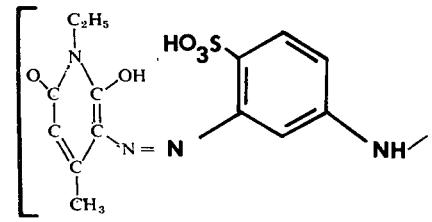

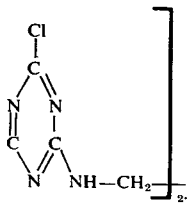

* * * * *

UNITED STATES PATENT OFFICE
CERTIFICATE OF CORRECTION

Patent No. 3,926,944   Dated December 16, 1975

Inventor(s) Alistair Howard Berrie and Richard Budziarek

It is certified that error appears in the above-identified patent and that said Letters Patent are hereby corrected as shown below:

Column 5, line 28 should read --1,3,4,5,6,7 and 8-sulphonaphth-1-ylamino--.

Column 7, line 22, delete "alkyl";

line 25, the structural formula should read

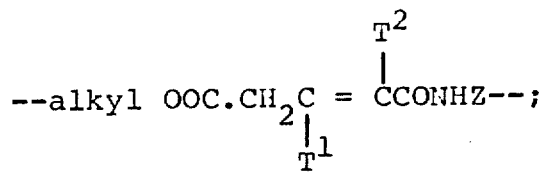

--alkyl OOC.CH$_2$C = CCONHZ--;

between lines 35 and 40, the structural formula should read --

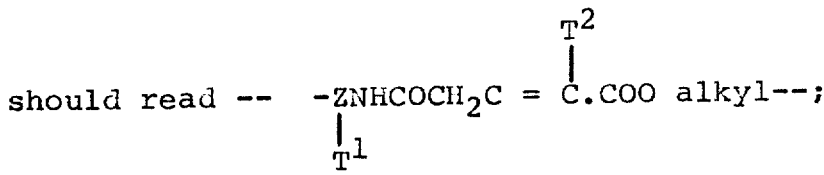

-ZNHCOCH$_2$C = C.COO alkyl--;

line 41, delete "alkyl";

between lines 56-57, delete "-anisoyl" (righthand side of listing)

Columns 9-10 (Example 6, Col. III) "m35hyl" should read --methyl--.

UNITED STATES PATENT OFFICE
CERTIFICATE OF CORRECTION

Patent No. 3,926,944      Dated December 16, 1975

Inventor(s) Alistair Howard Berrie and Richard Budziarek

It is certified that error appears in the above-identified patent and that said Letters Patent are hereby corrected as shown below:

Column 13 (Example 75, Col. I) "do." should read
--s-triazine--.

Column 15 (Example 80, Col. I) delete "2,4-dichloro-6-β".

Column 15 (Example 80, Col. II) "1,4-dimethyl-3-(N'-" should read --do.--.

Column 15 (Example 80, Col. III) "do." should read
--1,4-dimethyl-3-(N'- --.

Column 15 (Example 95, Col. I) "2,4-dichloro-6-μ-" should read --2,4-dichloro-6-β- --.

Column 34 (Example 306, Col.V) delete "-4-methyl-6-".

Column 34 (Example 306, Col. VI) "1-ethyl-3-cyano hydroxy pyrid-2-one" should read --1-ethyl-3-cyano-4-methyl-6-hydroxypyrid-2-one--.

Column 42 (Claim 7), the structural formula should read --

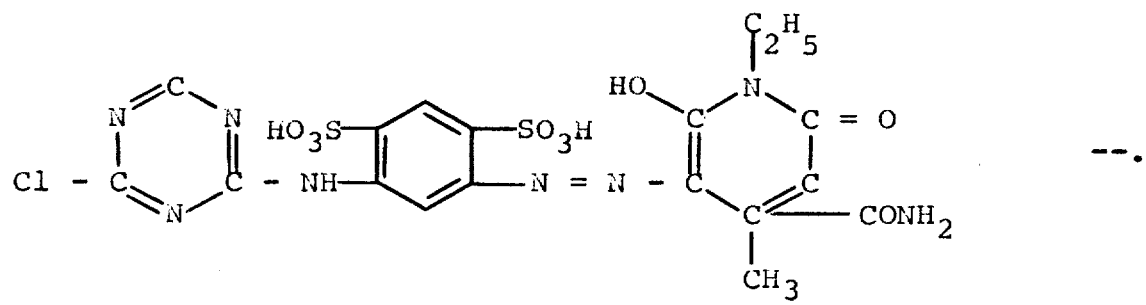

--.

Signed and Sealed this

Twenty-seventh Day of July 1976

[SEAL]

Attest:

RUTH C. MASON  
*Attesting Officer*

C. MARSHALL DANN  
*Commissioner of Patents and Trademarks*

UNITED STATES PATENT OFFICE
CERTIFICATE OF CORRECTION

Patent No. 3,926,944  Dated December 16, 1975

Inventor(s) ALISTAIR HOWARD BERRIE and RICHARD BUDZIAREK

It is certified that error appears in the above-identified patent and that said Letters Patent are hereby corrected as shown below:

Column 5, line 28, should read as printed.

line 27 should read:

--2,3,4,5,6, 7 and 8-sulphonaphth-1-ylamino--.

Column 42 (Claim 7), the structural formula should read --

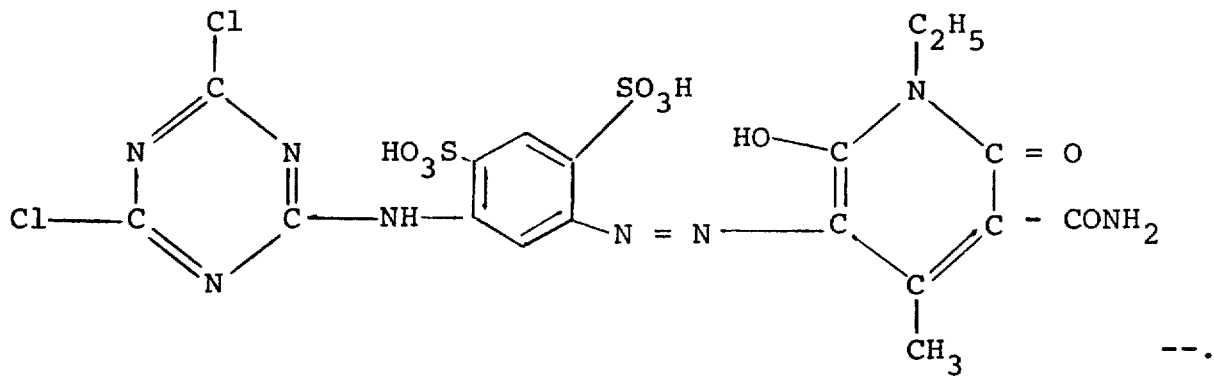

--.

[SEAL]

Signed and Sealed this

Twenty-first Day of September 1976

Attest:

RUTH C. MASON
*Attesting Officer*

C. MARSHALL DANN
*Commissioner of Patents and Trademarks*